United States Patent
Jiao et al.

(10) Patent No.: US 9,979,319 B1
(45) Date of Patent: May 22, 2018

(54) THREE-PHASE THREE-LEVEL INVERTER WITH ACTIVE VOLTAGE BALANCE

(71) Applicant: Toshiba International Corporation, Houston, TX (US)

(72) Inventors: Da Jiao, Houston, TX (US); Yu Liu, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days. days.

(21) Appl. No.: 15/358,590

(22) Filed: Nov. 22, 2016

(51) Int. Cl.
*H02M 7/487* (2007.01)
*H02M 1/32* (2007.01)

(52) U.S. Cl.
CPC .............. *H02M 7/487* (2013.01); *H02M 1/32* (2013.01)

(58) Field of Classification Search
CPC ........... H02M 7/003; H02M 7/487537; H02M 7/538; H02M 7/5387; H02M 1/32
See application file for complete search history.

(56) References Cited

U.S. PATENT DOCUMENTS

| | | | | |
|---|---|---|---|---|
| 7,495,938 B2* | 2/2009 | Wu | ........................ | H02M 7/487 363/172 |
| 8,929,114 B2* | 1/2015 | Li | ........................... | H02M 1/34 363/130 |
| 2002/0044472 A1* | 4/2002 | Arnet | ................. | H02M 7/53875 363/131 |
| 2007/0147098 A1* | 6/2007 | Mori | ......................... | H02J 3/01 363/71 |
| 2011/0227407 A1* | 9/2011 | Ransom | ..................... | B60L 3/00 307/9.1 |
| 2011/0267855 A1* | 11/2011 | Chapman | ................. | H02J 3/383 363/74 |
| 2014/0050000 A1* | 2/2014 | Teo | ........................ | H02M 7/487 363/131 |
| 2015/0318791 A1* | 11/2015 | Baumann | .............. | H02M 5/458 318/504 |
| 2016/0099654 A1* | 4/2016 | Viitanen | ................ | H02M 7/487 363/37 |
| 2016/0111971 A1* | 4/2016 | Rayner | ................... | H02M 1/14 307/52 |

OTHER PUBLICATIONS

New Modulation Techniques for a Leakage Current Reduction and a Neutral-Point Voltage Balance in Transformerless Photovoltaic Systems Using a Three-Level Inverter June-Seok Lee, Student Member, IEEE, and Kyo-Beum Lee, Senior Member, IEEE.*

Lee, June-Seok, and Kyo-Beum Lee. "New modulation techniques for a leakage current reduction and a neutral-point voltage balance in transformerless photovoltaic systems using a three-level inverter." IEEE Transactions on Power Electronics vol. 29, No. 4 (2014): 1720-1732.

* cited by examiner

*Primary Examiner* — Yemane Mehari
(74) *Attorney, Agent, or Firm* — Baker Botts L.L.P.

(57) ABSTRACT

A system and methods for active voltage balance of capacitors connected to a DC power source and to a three-phase three-level inverter, implemented by a controller comprising a space vector diagram is disclosed.

20 Claims, 35 Drawing Sheets

Sector 201 – active high P-Type

Sector 201 – active low P-Type

Sector 201 – active high N-Type

Sector 201 – active low N-Type

Sector 202 – active high P-Type

Sector 202 – active low P-Type

Sector 202 – active high N-Type

Sector 202 – active low N-Type

Sector 203 – active high P-Type

Sector 203 – active low P-Type

Sector 203 – active high N-Type

Sector 203 – active low N-Type

Section 204 – active high P-Type

Section 204 – active low P-Type

Section 204 – active high N-Type

Section 204 – active low N-Type

Sector 205 – active high P-Type

Sector 205 – active low P-Type

Sector 205 – active high N-Type

Sector 205 – active low N-Type

Sector 206 – active high P-Type

Sector 206 – active low P-Type

Sector 206 – active high N-Type

Sector 206 – active low N-Type

Sector 207 – active high P-Type

Sector 207 – active low P-Type

Sector 207 – active high N-Type

Sector 207 – active low N-Type

Sector 208 – active high P-Type

Sector 208 – active low P-Type

Sector 208 – active high N-Type

Sector 208 – active low N-Type

Sector 209 – active high P-Type

Sector 209 – active low P-Type

Sector 209 – active high N-Type

Sector 209 – active low N-Type

Sector 210 – active high P-Type

Sector 210 – active low P-Type

Sector 210 – active high N-Type

Sector 210 – active low N-Type

Sector 211 – active high P-Type

Sector 211 – active low P-Type

Sector 211 – active high N-Type

Sector 211 – active low N-Type

Sector 212 – active high P-Type

Sector 212 – active low P-Type

Sector 212 – active high N-Type

Sector 212 – active low N-Type

Sector 213 – active high P-Type

Sector 213 – active low P-Type

Sector 213 – active high N-Type

Sector 213 – active low N-Type

Sector 214 – active high P-Type

Sector 214 – active low P-Type

Sector 214 – active high N-Type

Sector 214 – active low N-Type

Sector 215 – active high P-Type

Sector 215 – active low P-Type

Sector 215 – active high N-Type

Sector 215 – active low N-Type

Sector 216 – active high P-Type

Sector 216 – active low P-Type

Sector 216 – active high N-Type

Sector 216 – active low N-Type

Sector 217 – active high P-Type

Sector 217 – active low P-Type

Sector 217 – active high N-Type

Sector 217 – active low N-Type

Sector 218 – active high P-Type

Sector 218 – active low P-Type

Sector 218 – active high N-Type

Sector 218 – active low N-Type

Sector 219 – active high P-Type

Sector 219 – active low P-Type

Sector 219 – active high N-Type

Sector 219 – active low N-Type

Sector 220 – active high P-Type

Sector 220 – active low P-Type

Sector 220 – active high N-Type

Sector 220 – active low N-Type

Sector 221 – active high P-Type

Sector 221 – active low P-Type

Sector 221 – active high N-Type

Sector 221 – active low N-Type

Sector 222 – active high P-Type

Sector 222 – active low P-Type

Sector 222 – active high N-Type

Sector 222 – active low N-Type

Sector 223 – active high P-Type

Sector 223 – active low P-Type

Sector 223 – active high N-Type

Sector 223 – active low N-Type

Sector 224 – active high P-Type

Sector 224 – active low P-Type

Sector 224 – active high N-Type

Sector 224 – active low N-Type

THREE-PHASE THREE-LEVEL INVERTER WITH ACTIVE VOLTAGE BALANCE

FIELD

Embodiments described herein relate generally to power conversion, and specifically to a three-phase three-level inverter with active voltage balance.

BACKGROUND

Power inverters include circuitry that functions to change direct current (DC) power to alternating current (AC) power. The size, configuration, and control of an inverter may depend on its application. For instance, in a large-scale power system with an AC power grid, a three-phase inverter is typically used to connect a DC power source, such as one or more photovoltaic (PV) panels, to the power grid. In those applications, an oftentimes heavy and expensive transformer is typically used to isolate the PV panel from the AC power source. Removing the transformer may be beneficial in that it reduces the size and expense of the power system, but the lack of isolation can cause a common mode leakage current to form, which can degrade the current provided by the inverter to the power grid or improperly trigger ground fault protection. Similar leakage currents generated at inverters used in other applications can have the same deleterious effects. Different types of inverters may be used to make this connection, including, but not limited to, neutral-point-clamped (NPC) inverters, flying capacitor inverters, and cascaded H-bridge inverters. Each type of inverter may have benefits and drawbacks. For instance, NPC inverters typically have the fewest number of components and can use less expensive components with lower voltage ratings. NPC inverters, however, can experience voltage imbalance problems that can increase the total harmonic distortion (THD) in the output signal. NPC and other types of inverters may also suffer from leakage current that can further degrade the output signal.

BRIEF DESCRIPTION OF THE DRAWINGS

Some specific exemplary embodiments of the disclosure may be understood by referring, in part, to the following description and the accompanying drawings.

Figure 1A:
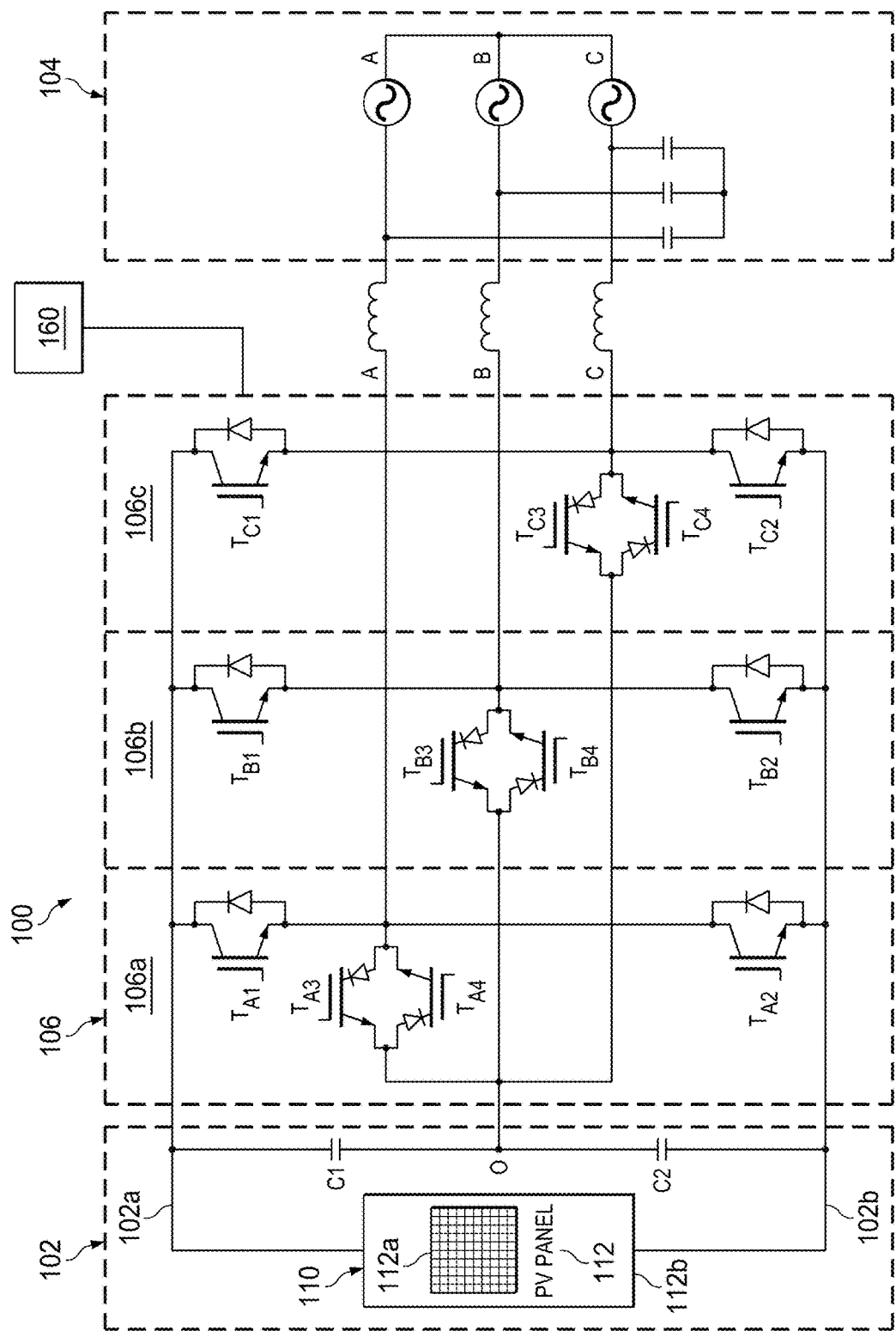
FIGS. 1A-B illustrate an example power system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Embodiments described herein relate generally to power systems thereof, and specifically to a three-phase three-level inverter with reduced common mode leakage current and active balance control.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet, local area network (LAN), radio frequency, power-line communication (PLC), or other communication means that would be appreciated by one of ordinary skill in the art in view of this disclosure. Thus, if a first device communicatively couples to a second device, that connection may be through a direct connection, or through an indirect communication connection via other devices and connections.

Hereinafter, embodiments will be described with reference to the drawings. Each drawing is a schematic view for describing an embodiment of the present disclosure and promoting the understanding thereof. The drawings should not be seen as limiting the scope of the disclosure. In each drawing, although there are parts differing in shape, dimension, ratio, and so on from those of an actual apparatus, these parts may be suitably changed in design taking the following descriptions and well-known techniques into account.

Figure 1B:
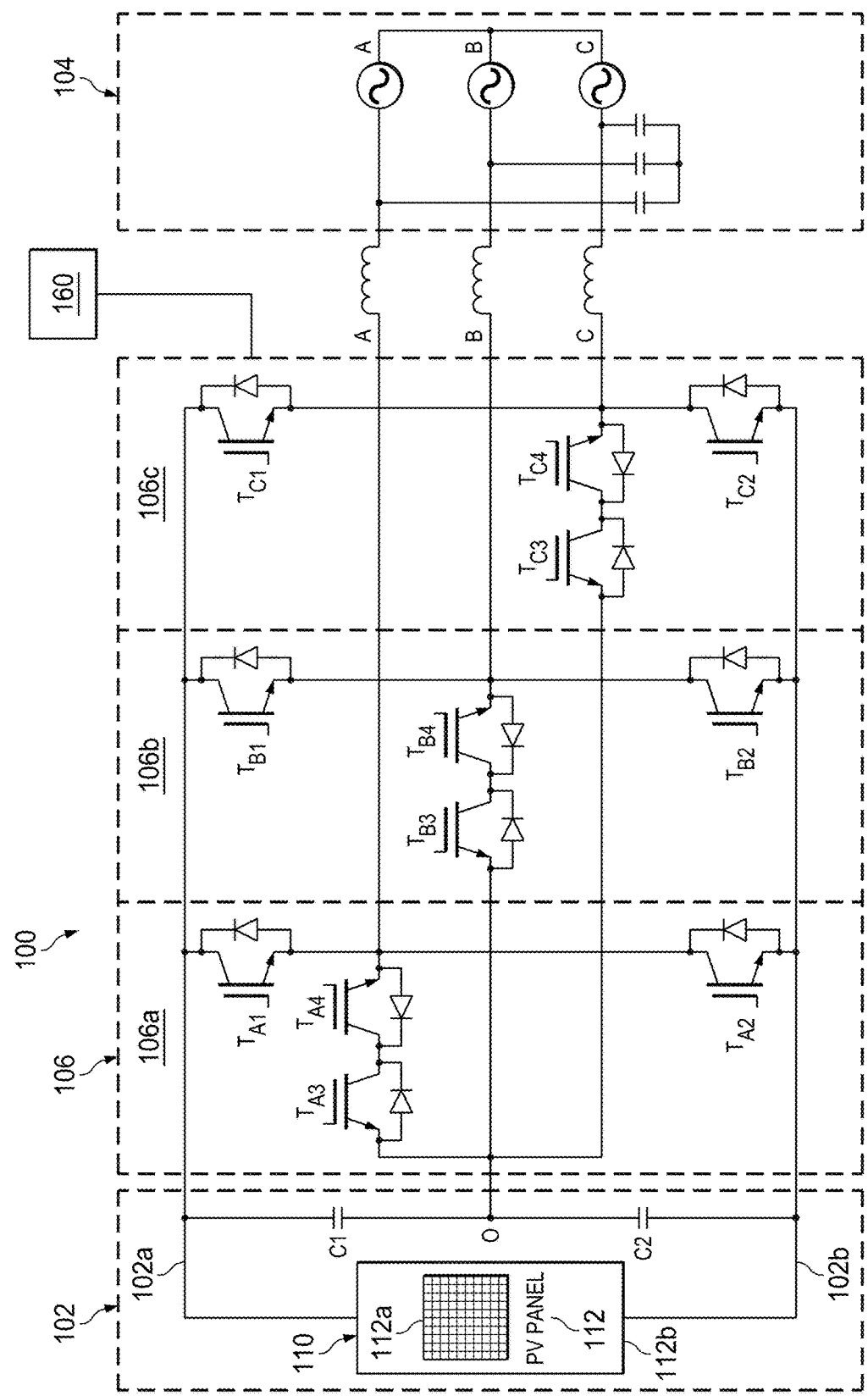

FIGS. 1A and 1B diagram an example power system 100 comprising a DC connection 102, a three-phase AC connection 104, and a three-phase three-level inverter 106 that includes three phases 106a, 106b, and 106c of switches for coupling the DC connection 102 and the three-phase AC connection 104. The DC connection 102 comprises first and second DC terminals 102a and 102b for receiving power from a DC source 110, as well as first and second DC bus capacitors C1 and C2 coupled in series between the terminals 102a/102b. The capacitors C1 and C2 may be coupled together at a common node or the neutral point O. The voltage across the terminals 102a and 102b may be referred to as a DC bus voltage, $V_{DC}$, with the terminal 102a comprising a positive terminal and the terminal 102b comprising a negative terminal. The capacitors C1 and C2 may have substantially the same capacitance and voltage ratings, such that the neutral point O is ideally at a voltage half way between the voltages at the DC terminals 102a and 102b.

As depicted, the DC source 110 comprises a PV panel 112 that includes one or more PV cells 112a and a frame 112b. Although only one PV panel 112 is depicted, the DC source 110 may comprise a plurality of PV panels or other PV elements than generate DC power. The DC source 110 may also comprise any other DC sources that would be appreciated by one of ordinary skill in the art in view of this disclosure, including, but not limited to batteries.

The AC connection 104 comprises three input terminals A, B, and C that are respectively coupled to output terminals of the phases 106a, 106b, and 106c of the inverter 106. These A, B, and C terminals may be connected, for instance, to a Y-connected three-phase load (not shown) at the AC connection 104, or to any other multi-phase implementation that would be appreciated by one of ordinary skill in the art in view of this disclosure. In certain embodiments, the AC connection 104 may comprise, for instance, a public power grid or a local power grid or system that may receive power from the PV panel 112 through the inverter 106 and provide AC power to buildings, houses, and the like. The AC power destination 104 is not limited to power grids, however, and may comprise any device or system that requires or uses AC power.

The phases 106a, 106b, and 106c of the inverter 106 may comprise respective switching devices $T_{A1}$-$T_{A4}$, $T_{B1}$-$T_{B4}$, and $T_{C1}$-$T_{C4}$ The switching devices $T_{A1}$-$T_{A4}$, $T_{B1}$-$T_{B4}$, and $T_{C1}$-$T_{C4}$ may comprise one or more transistors, including, but not limited to, bipolar junction transistors (BJTs), junction gate field-effect transistors (JFETs), and metal-oxide-semiconductor field-effect transistor (MOSFETs). As depicted in FIG. 1A, the switching devices $T_{A1}$-$T_{A4}$, $T_{B1}$-$T_{B4}$, and $T_{C1}$-$T_{C4}$ of each phase are arranged in a t-type configuration with respect to the DC terminals 102a and 102b and the neutral point O. For instance, with respect to phase 106a, the switching devices $T_{A1}$ and $T_{A2}$ are connected in series between the terminals 102a and 102b, and the switching devices $T_{A3}$ and $T_{A4}$ are connected in parallel with opposite polarity to the neutral point O and a common node between the switching devices $T_{A1}$ and $T_{A2}$, to which the lead A is also connected. The switching devices $T_{B1}$-$T_{B4}$ and $T_{C1}$-$T_{C4}$ of phases 106b and 106c may comprise similar arrangements with respect to the neutral point O, the terminals 102a/b, and the corresponding leads of the AC connection 104.

FIG. 1B illustrates an alternative configuration, in which switching devices $T_{A3}$ and $T_{A4}$ are each configured in parallel with a diode and the switching device/diode pairs are arranged in series between, but with opposite polarities to, the neutral point O and a common node between the switching devices $T_{A1}$ and $T_{A2}$, to which the lead A is also connected. As in FIG. 1A, FIG. 1B shows the switching devices $T_{B1}$-$T_{B4}$ and $T_{C1}$-$T_{C4}$ of phases 106b and 106c may comprise similar arrangements with respect to the neutral point O, the terminals 102a/b, and the corresponding leads of the AC connection 104. The switching device configurations illustrated in FIGS. 1A and 1B are not intended to be limiting, however, as other configurations are possible.

The inverter 106 may further comprise a controller 160. The controller 160 may comprise an information handling system with a processor and a memory device coupled to the processor. In certain embodiments, the controller 160 may comprise microprocessors, microcontrollers, digital signal processors (DSP), application specific integrated circuits (ASIC), or any other digital or analog circuitry configured to interpret and/or execute program instructions and/or process data. The controller 160 may be coupled to and control the operation of the switching devices $T_{A1}$-$T_{A4}$,$T_{B1}$-$T_{B4}$, and $T_{C1}$-$T_{C4}$. For instance, the controller 160 may output individual switching signals to each of the switching devices $T_{A1}$-$T_{A4}$, $T_{B1}$-$T_{B4}$, and $T_{C1}$-$T_{C4}$ to turn the switching devices "on" to conduct current, or "off" to prevent current flow. In the embodiment depicted, where the switching devices $T_{A1}$-$T_{A4}$, $T_{B1}$-$T_{B4}$, and $T_{C1}$-$T_{C4}$ comprise transistors, the controller 160 may be coupled to the gates of the transistors, and the switching signals may comprise voltage signals applied to the gates of the transistors.

The controller 160 may operate each of the phases 106a-c individually in one of three modes or levels. A first mode may be referred to as "P" and may correspond to a configuration in which the switches of a given phase connect the corresponding lead of the AC connection 104 to the positive terminal 102a of the DC connection. With respect to the phase 106a, a P-mode may be established when transistors $T_{A2}$ and $T_{A3}$ are "off" and either transistor $T_{A1}$ alone is "on" or both transistors $T_{A1}$ and $T_{A4}$ are "on," such that the lead A is connected to the terminal 102a. A second mode may be referred to as "O" and may correspond to a configuration in which the switches of a given phase connect the corresponding lead of the AC connection 104 to the neutral point O. With respect to the phase 106a, an O-mode may be established when transistors $T_{A3}$ and $T_{A4}$ are "on" and transistors $T_{A1}$ and $T_{A2}$ are "off," such that the lead A is connected to the neutral point O. A third mode may be referred to as "N" and may correspond to a configuration in which the switches of a given phase connect the corresponding lead of the AC connection 104 to the negative terminal 102b of the DC connection 102. With respect to the phase 106a, an N-mode may be established when transistors $T_{A1}$ and $T_{A4}$ are "off" while either transistor $T_{A2}$ alone is "on" or both transistors $T_{A2}$ and T are "on," such that the lead A is connected to the terminal 102b.

The inverter 106 may be characterized by one or more switching states that correspond to the combinations of modes in which the phases 106a-c are operating at a given time. For instance, one switching state may be referred to as "PPP" and may correspond to a state of the inverter 106 in which all three phases 106a-c are operating in the P-mode such that each lead A, B, and C of the AC connection 104 is connected to the terminal 102a. Another example switching state may be referred to as "PON" and may correspond to a state of the inverter 106 in which the first phase 106a is operating in the P-mode, the second phase 106b is operating in the O-mode, and the third phase 106c is operating in the N-mode. In all, there may be twenty-seven ($3^3$) total possible switching states for the inverter 106. A switching state may correspond to a combination of the three modes, P, O, or N. Each mode corresponds to one of three output voltage levels at the three-phase AC connection 104: $V_{DC}, V_{DC}/2$, and 0.

Each of the switching states may generate and correspond to a common mode voltage within the inverter 106 and DC connection 102. The common mode voltage may depend, in part, on the modes of the phases 106a-c within a particular switching state, and, in particular, on the voltage levels established at each of the A, B, and C leads of the AC connection. In certain embodiments, the common mode voltages corresponding to each possible switching state of the inverter 106 may be determined using the following equation:

$$V_{CM} = (V_{AO} + V_{BO} + V_{CO})/3$$

where $V_{CM}$ comprises the common mode voltage, $V_{AO}$ comprises the voltage potential between the terminal A and the common node O; $V_{BO}$ comprises the voltage potential between the terminal B and the common node O; and $V_{CO}$ comprises the voltage potential between the terminal C and the common node O. P-mode corresponds to a voltage potential between a terminal A, B, or C and the common node O of $V_{DC}/2$; O-mode corresponds to a voltage potential between a terminal A, B, or C and the common node O of 0, and N-mode corresponds to a voltage potential between terminal A, B, or C and the common node O of $-V_{DC}/2$.

According to aspects of the present disclosure, the controller 160 may reduce the common mode voltage, and thereby reduce common mode leakage current, by operating the inverter 106 using a subset of the possible switching states. The subset may be determined based, at least in part, on the common mode voltages corresponding to each switching state. The voltage potentials at the leads A, B, and C may be determined for each of the P, O, and N modes when the potentials at the leads 102a/b and the common node O are known. The common mode voltages corresponding to the twenty-seven total possible switching states of the inverter 106 are summarized in the following table:

| Group | Switching States | $V_{CM}$ | $|V_{CM}|$ |
|---|---|---|---|
| A | PPP | $+V_{DC}/2$ | $+V_{DC}/2$ |
| B | PPO, POP, OPP | $+V_{DC}/3$ | $+V_{DC}/3$ |
| C | PNP, PPN, NPP, POO, OPO, OOP | $+V_{DC}/6$ | $+V_{DC}/6$ |
| D | OOO, PON, PNO, OPN, ONP, NPO, NOP | 0 | 0 |
| E | PNN, NPN, NNP, NOO, ONO, OON | $-V_{DC}/6$ | $+V_{DC}/6$ |
| F | NNO, NON, ONN | $-V_{DC}/3$ | $+V_{DC}/3$ |
| G | NNN | $-V_{DC}/2$ | $+V_{DC}/2$ |

As can be seen in the table, certain of the switching states share common mode voltage absolute values, and those switching states are grouped accordingly. The groups with the greatest absolute value of $V_{CM}$, groups A and G, are those in which all of the leads A, B, and C of the AC connection 104 are connected to the same terminal 102a/b of the DC connection. Conversely, group D comprises a zero $V_{CM}$ and includes a switching state, OOO, in which the leads A, B, and C are decoupled from the terminals 102a/b of the DC connection 102, and switching states in which one of the leads A, B, and C is connected to the terminal 102a, another lead is connected to the terminal 102b, and the remaining lead is connected to the common node O. The remaining groups B, C, E, and F can be divided into two categories. The first category contains groups B and F and is characterized by switching states in which two of the leads are connected to the same terminal 102a/b and the remaining lead is connected to the common node O. The second category contains groups C and E and is characterized by switching states in which either two of the leads are connected to the common node O and the third is connected to one of the terminals 102a/b, or two of the leads are connected to one of the terminals 102a/b and the third lead is connected to the other one of the terminals 102a/b.

A preferred subset of switching states used to control the inverter 106 may be determined by selecting the switching states corresponding to the lowest common mode voltages and excluding the switching states corresponding to the highest common mode voltages. In certain embodiments, the switching states used within the controller 160 to control the inverter 106 may be selected using a threshold of $\pm V_{DC}/6$, such that any switching states with $V_{CM}$ values higher (or lower depending on the polarity) than $\pm V_{DC}/6$ are excluded. In the embodiment shown, this may exclude the switching states in groups A, B, F, and G, leaving 19 switching states available for control of the inverter. In addition to having $V_{CM}$ values above the threshold, the switching states within the groups A, B, F, and G comprise the modal arrangements described above in which at least two of the leads of the AC connection 104 are connected to the same terminal 102a/b, and the remaining lead is not connected to the opposing terminal 102a/b.

By excluding switching states with higher $V_{CM}$ values, the resulting $V_{CM}$ generated at the inverter 106 may be reduced or suppressed. This may, in turn, lead to a reduction in the magnitude of the common mode leakage current. Specifically, the magnitude of the common mode leakage current is a function of the magnitude of the common mode voltage, such that reducing the magnitude of the common mode voltage necessarily reduces the magnitude of the common mode leakage current. Reducing the common mode leakage current may alleviate or limit deleterious effects on the AC connection 104 and fault circuitry caused by the leakage current.

In operation, the controller 160 may cycle through some or all of the switching states to produce an AC output from the inverter 106. The AC output depends, in part, on the combinations of voltage levels established at the output terminals of the inverter 106 during each switching state. The consistency of the AC output from the inverter 106 may, therefore, depend on the consistency of the voltage levels associated with the terminals 102a/102b and common node O, to which the output terminals are connected to establish the necessary voltage levels. The voltage level at the neutral point O may be particularly vulnerable to fluctuations due to its dependence on the voltages across the capacitors C1 and C2, which are established and maintained by periodically charging and discharging the capacitors C1 and C2. As described above, the voltage levels across the capacitors C1 and C2 are ideally the same, such that the voltage level at the neutral point O is consistently at a mid-point voltage between the terminals 102a-b. In certain instances, however—such as when the capacitors C1 and C2 age or breakdown, or the charging and discharging sequence is incorrect—the voltage levels across C1 and C2 may become unbalanced. This may result in fluctuations or ripples in the voltage level at the neutral point O, which can cause harmonic distortions at the AC connection.

These fluctuations in the common mode voltages may at least partially cause leakage currents within the inverter 106. As depicted, the metal frame 112b of the PV panel 112 is connected to a ground potential, a grounding configuration that may be required by law in certain jurisdictions. In conjunction with the grounding configuration, the PV panel 112 may further comprise a parasitic capacitance (not shown) between the PV cells 112a and the frame 112b. Without any isolation between the panel 112 and the AC grid 104, as is the case with a transformerless inverter, the high-frequency components of the common mode voltage may generate a common mode leakage current through the parasitic capacitance of the PV panel 112 to the ground, which is common to both the PV panel 112 and the AC grid 104. This common mode leakage current is problematic and may cause distortions in the current of the grid 106, electromagnetic interference, and erroneous triggers in a fault detection system (not shown) incorporated into the inverter 106 or system 100.

Modifications, additions, or omissions may be made to FIG. 1 without departing from the scope of the present disclosure. For instance, FIG. 1 illustrates an example inverter and power system in a particular configuration, but other types and configurations of inverters and power systems are possible within the scope of this disclosure. Furthermore, fewer components or additional components beyond those illustrated may be included in without departing from the scope of the present disclosure.

Figure 2:
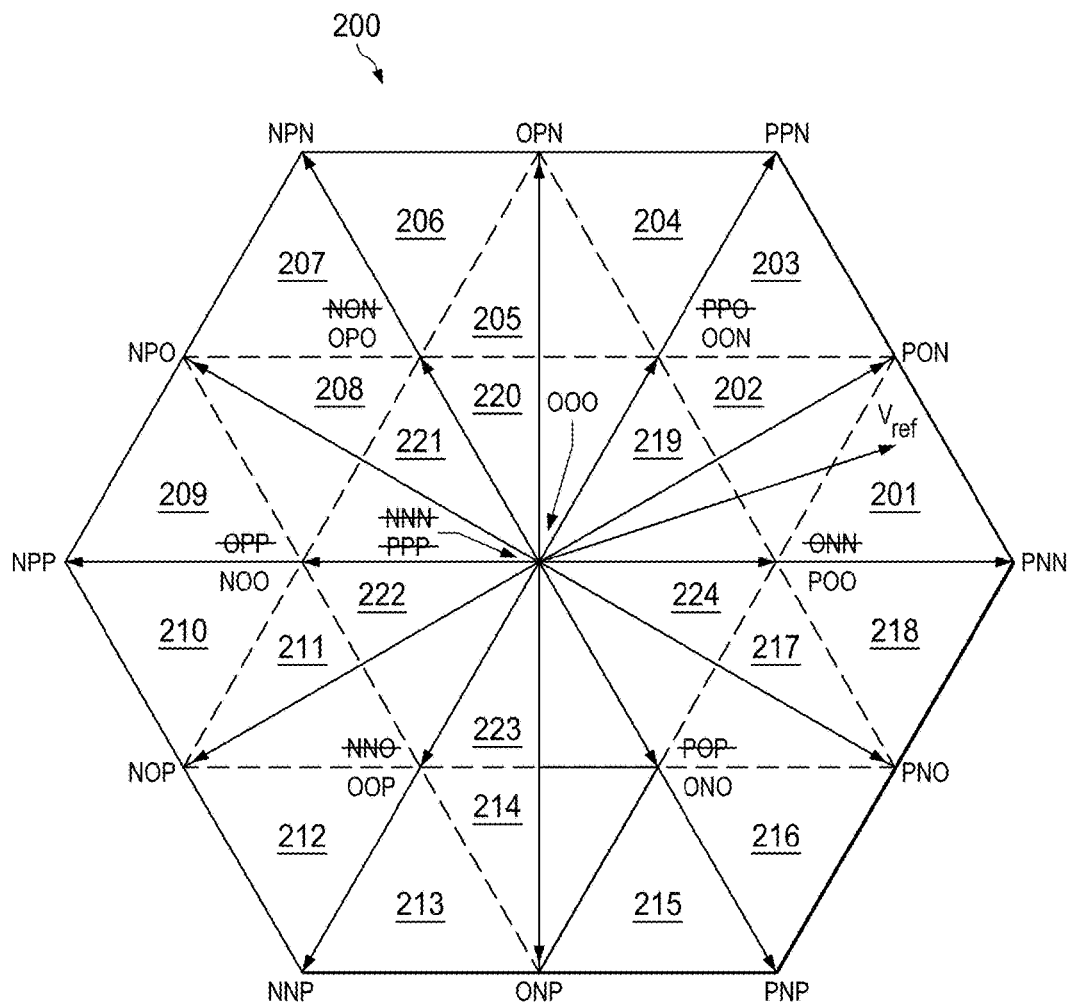
FIG. 2 is a diagram illustrating an example space vector diagram for space vector modulation, according to aspects of the present disclosure.

In certain embodiments, the controller 160 may control the inverter 106 using a subset of switching states in a space vector modulation algorithm. FIG. 2 illustrates an example space vector diagram 200 for the space vector modulation algorithm using a subset of switching states, according to aspects of the present disclosure. The diagram 200 may correspond to the inverter 106, but other diagrams that correspond to this or other inverter configurations are possible within the scope of this disclosure.

As depicted in FIG. 2, each of the twenty-seven total switching states of the inverter 106 are represented by a corresponding vector in the diagram 200. The switching states OOO, NNN, and PPP comprise zero vectors positioned at the center of the diagram 200. The switching states PNN, PPN, NPN, NPP, NNP, and PNP comprise large vectors positioned at the outside of the diagram. The switching states PON, OPN, NPO, NOP, ONP, and PNO comprise medium vectors positioned between the large vectors at the outside of the diagram 200. The switching states POO/ONN, PPO/OON, OPO/NON, OPP/NOO, OOP/NNO, and POP/ONO comprise complementary small vectors arranged between the zero vectors and the large vectors in the diagram 200. Because one of each complementary small vector pair is associated with a higher common mode voltage, the switching states of groups A, B, F and G in the table above, comprising the higher common mode voltages, have been stricken through in the diagram 200, indicating they are not available within the control scheme while the remaining 19 switching states are available to the controller.

The diagram 200 in FIG. 2 may be divided into 24 identically sized triangles called sectors. Each sector may be identified by the three vectors pointing to the corners of the sector. These vectors are considered "adjacent to" the sector. The arrangement is not intended to be limiting, however, as diagrams corresponding to different inverter configurations may comprise different numbers and orientations of sectors.

In certain embodiments, the switching states and corresponding switching signals may be determined, at least in part, using a reference vector $V_{ref}$ within the diagram 200 in FIG. 2 and trigonometrically calculating how to create the reference vector $V_{ref}$ using vectors adjacent to $V_{ref}$, as would be appreciated by one of ordinary skill in the art in view of this disclosure. Specifically, the trigonometric calculations may produce angle and magnitude values characterizing the relationship between the reference vector $V_{ref}$ and the three adjacent vectors. These angle and magnitude values then may be used to determine the dwell time for each of the switching states corresponding with the three adjacent vectors. The dwell time is the duration for which a particular state is applied by the controller. As depicted, the diagram 200 is divided into twenty four triangular sectors 201-224, each of which may be associated with a different set of vectors and corresponding switching signals and where traditionally the associated vectors are those adjacent to the sector. Although the reference vector $V_{ref}$ is shown within sector 201, the reference vector $V_{ref}$ can take different positions within the diagram during each switching period of the inverter 106, as will be described below. Each sector may be associated with a different set of switching signals that may be stored in or otherwise generated by the controller 160 and transmitted to the switching devices of the inverter 106 when the reference vector is located within the corresponding sector.

As depicted, the vectors adjacent to the reference vector $V_{ref}$ in sector 201 comprise the large vector PNN, medium vector PON, and the complementary pair of small vectors POO/ONN. A typical switching sequence associated with the sector 201 would therefore include the switching signals associated with the PNN and PON switching states and complementary switching states POO/ONN. By excluding the ONN switching state, however, the high common mode voltage associated with the ONN switching state may be avoided, and the complementary switching state POO, which produces a lower common mode voltage, may be substituted in any set of switching signals calculated to produce the reference vector $V_{ref}$.

Figures 4A, 4B:
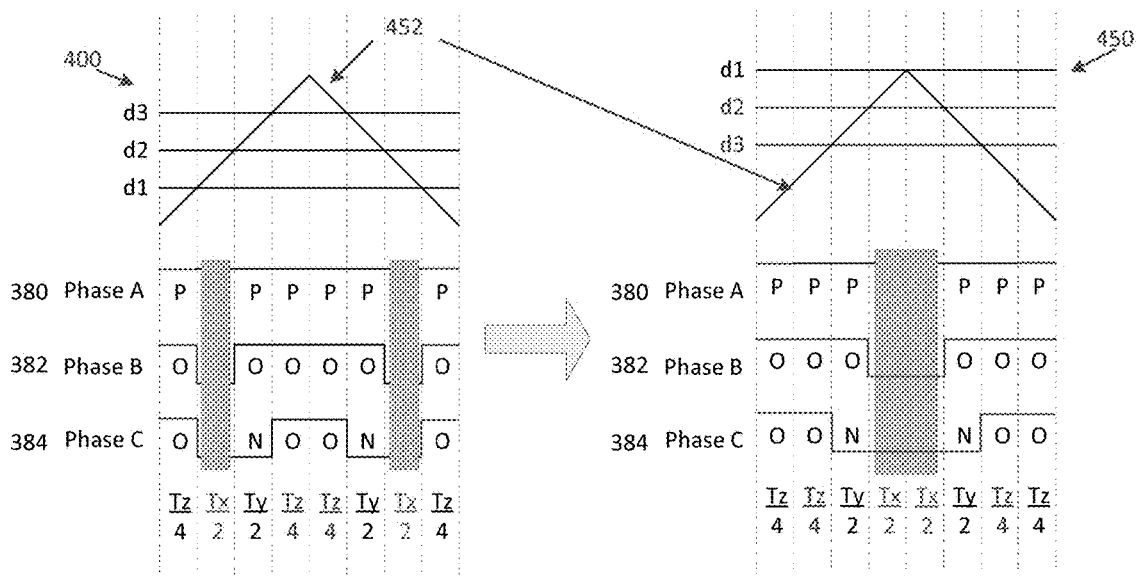

The common mode voltage of an inverter system may likewise be controlled by selecting a sector from the sectors 201-224 in which to operate the inverter over a given time period, or operating in a given sector based on the position of the reference vector $V_{ref}$. As depicted, the controller may implement "active-high" functionality or "active-low" functionality for each phase (see FIGS. 13-36). An implementation may be referred to as active-low if the switching sequence enters a "lower" mode during "active" times, where active times occur when the modulation waveform exceeds an associated duty cycle. As illustrated in FIG. 4B, sector 201 may be labeled "active-low" because the phases B 382 and C 384 are switched from a higher mode O to a lower mode N when the modulation waveform 452 exceeds their associated duty cycles d2 and d3. Conversely, an implementation may be referred to as active-high if the switching sequence enters a "higher" mode during "active" times. As illustrated in FIG. 6B, sector 203 may be an "active-high" sector because the phases 380 and 382 are switched from a lower mode O to a higher mode P when the modulation waveform 652 exceeds their associated duty cycles d1 and d2.

Figure 13A:
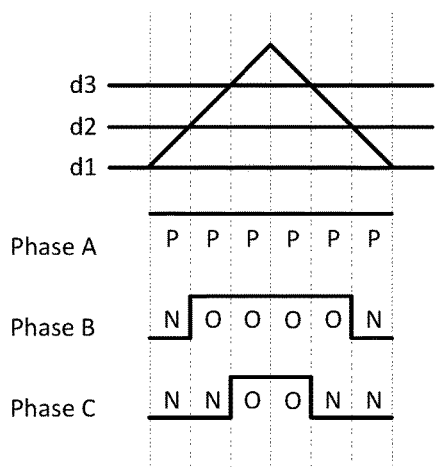
FIGS. 13A-D through FIGS. 36A-D illustrate active-high and active-low complementary P- and N-type sequences associated with the 24 sectors illustrated in FIG. 2, according to aspects of the present disclosure.
Figure 13B:
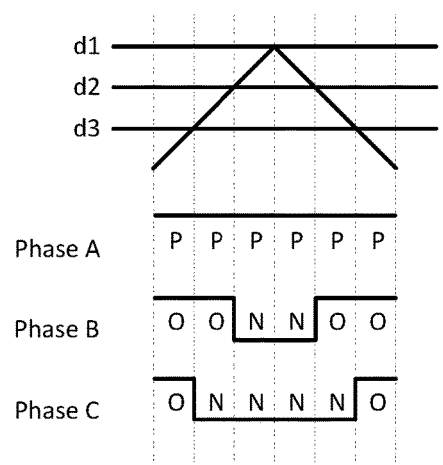
Figure 13C:
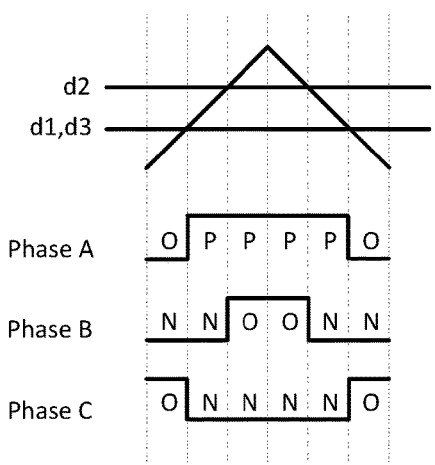
Figure 13D:
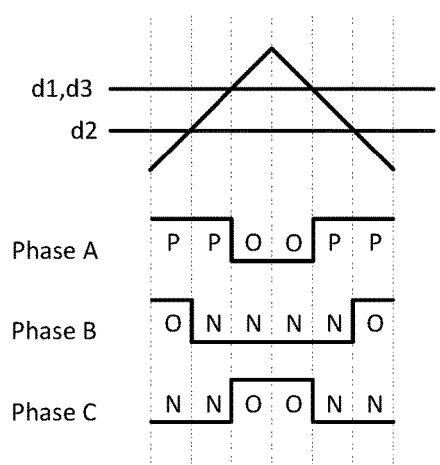
Figure 14A:
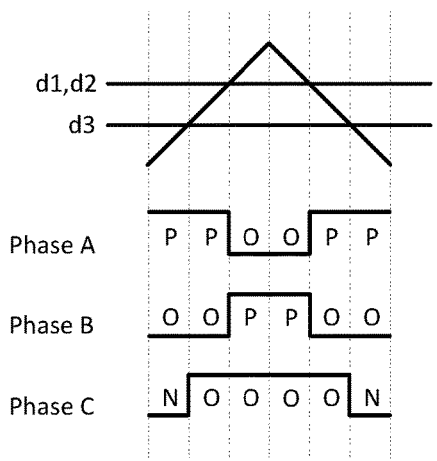
Figure 14B:
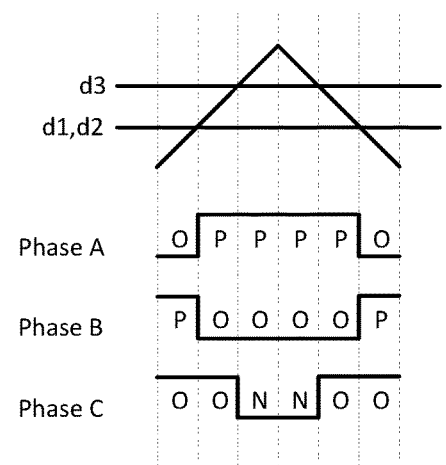

Note that all three phases, depicted in FIGS. 13-36, may be active-high or active-low. For example, when all three phases in FIG. 13A are active-high, the set of phases may be categorized as active-high. Alternatively, when all three phases in 13B are active-low, the phases may be categorized as active-low. On the other hand, many sectors may comprise a mix of active-high and active-low phases and may be categorized based on whether more phases are active-high or active-low. Specifically, one phase may be active-high while the two remaining phases are active-low, or one phase may be active-low while the others are active-high. For example, FIG. 14A may be categorized as active-high because phases B and C, corresponding to duty cycles d2 and d3, are active-high, while phase A, corresponding to duty cycle d1, is active-low. In contrast, FIG. 14B depicts a set of phases that may be categorized as active-low because phases B and C are active-low and only phase A is active-high. The remaining figures may be similarly categorized as active-high or active-low.

According to aspects of the present disclosure, a controller may operate an associated inverter by cycling through a subset of the sectors over a fundamental period and sending the switching signals associated with a given sector to the phases of the inverter while the inverter is operating within a given sector. In certain embodiments, the controller may switch between active-high and active-low sequences during the fundamental period of the inverter to balance the common mode voltage using the appropriate sequences of switching signals.

Figures 3A, 3B:
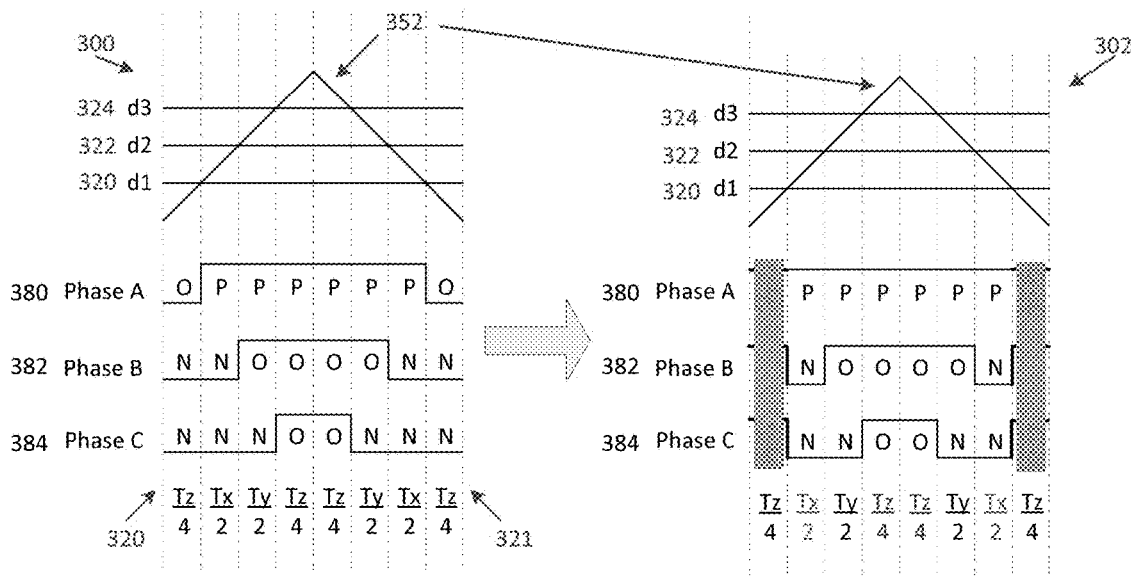
FIGS. 3A-B through 6A-B are diagrams illustrating an example modulation scheme, according to aspects of the present disclosure.

FIGS. 3A and 3B illustrate examples of the controller applying a switching signal to the three phases A, B, and C, to balance the common mode voltage. The horizontal axis represents time with one switching period spanning the start of the switching period 320 and the end of the switching period 321, shown in FIG. 3A. A switching interval, or dwell time, is represented by the space between dashed vertical lines. The switching period may be calculated by taking the inverse of the inverter switching frequency. For example, a 10 kHz inverter will have a 100 μs switching period. As depicted, phase A 380 of the sequence 300 corresponds to the first phase of the inverter, phase B 382 to the second phase of the inverter, and phase C 384 to the third phase of the inverter. Each individual entry within the rows and columns of sequence 300 may identify the mode (e.g., P, O, or N) in which the corresponding phase is operating during the corresponding time interval. Therefore, a column of sequence 300 may identify the switching state of the inverter during the corresponding dwell time. For example, the first switching state of FIG. 3A is ONN. It should be appreciated that the dwelling time for a particular switching signal may be different than others (not shown). The dwell time of a given signal may be calculated using the position of $V_{ref}$ (discussed below). Note that while the width of each switching interval in the figures is identical, the figures are illustrative and the dwell times of switching states may be different in implementation.

The switching states corresponding to the small vectors not eliminated from FIG. 2 may be primarily responsible for charging, discharging, and maintaining the DC bus capacitors to balance the common mode voltage, because they are associated with the higher voltage states shown in the table above. After substitution, a sole short vector in a sequence of switching states may categorize a sequence of switching states as P-type or N-type. The set of switching signals may be categorized as P-type when the short vector in the set contains a P without an offsetting N (e.g., POO, OPO, or OOP), or categorized as N-type when the short vector in the set contains an N without an offsetting P (e.g., NOO, ONO, or OON). With respect to inverter 106, for instance, P-type small vectors (e.g., POO, OPO, OOP) may be responsible for charging the capacitor C2 and discharging the capacitor C1, which is desirable when the voltage over C1 is greater than the voltage over C2. N-type small vectors (e.g., NOO, ONO, OON) may be responsible for charging the capacitor C1 and discharging the capacitor C2, which is desirable when the voltage over C1 is less than the voltage over C2.

FIGS. 3A-B illustrate an example modulation scheme, according to aspects of the present disclosure. FIGS. 3A-B depict sequences associated with sector 201 and the specific excluded switching states discussed above, it should be appreciated that other switching sequences and corresponding switching signals may be generated with respect to other reference vectors, other diagrams, and other excluded switching states. The sequence 300 in FIG. 3A comprises four switching states, PNN, PON, and complementary small vectors ONN/POO, which correspond to vectors adjacent to sector 201 of FIG. 2. The modulation waveform 352 of FIGS. 3A-B may be produced by the controller 160 as part of the switching algorithm or may be a predefined triangular waveform. The modulation waveform 352 determines the frequency at which phase A 380, phase B 382, and phase C 384 may change and therefore determines the switching frequency. Phase A 380, phase B 382, and phase C 384 may be produced by comparing the modulation waveform 352 with the duty cycles d1 320, d2 322, and d3 324. As discussed above, sequence 300 is implemented as active-high, where a phase changes when the modulation waveform exceeds its associated duty cycle.

FIG. 3B may be produced by substituting small vector POO for its complementary pair ONN. The ONN switching states of the sequence 300 of FIG. 3A have been replaced by the complementary POO switching state to produce the sequence 302 of FIG. 3B. While the dwell times in this example of the sequence 302 are unchanged as compared with the sequence 300 and common mode leakage current may be reduced by substituting the lower common mode voltage POO switching state for the excluded ONN switching state, the sequence 302 increases the switching frequency of the inverter. Specifically, the modes of each phase change only twice in sequence 300, in this case rising from a lower phase to a higher phase. In contrast, the modes of the phase B 382 and the phase C 384 change four times in sequence 302. This doubles the switching frequency and may increase both switching losses and leakage current.

Additionally, after substitution of the POO switching state, the modulation waveform 352 cannot be used to implement the sequence 302 as was possible with the sequence 300. Comparison of the duty cycles d1 320, d2 322, and d3 324 of the inverter to the modulation waveform 352 may not produce the required pulse width modulation (PWM) output for phases A 380, B 382, and C 384 of sequence 302. For instance, sequence 302 shows phase B 382 falling from the higher O-mode to lower N-mode after the first dwell time, even though the modulation waveform has not yet passed duty cycle d2. Similar comparisons may be performed for duty cycle d1 320 and phase A 380, and for duty cycle d3 324 and phase C 384. Sequence 302 would, therefore, require a different and more complex implementation algorithm. Accordingly, this substitution reduces the common mode voltage and has no effect on the dwell times for each switching state, but may produce undesirable consequences.

Not only does substitution of a lower common mode voltage switching state reduce leakage current, it may also help balance the voltage across capacitors C1 and C2 of FIG. 2. In fact, a P-type switching state may be substituted for an N-type switching state, or vice versa, in a sequence to balance the capacitor voltages. For example, the sequence 302 in FIG. 3 may upset the voltage balance between bus capacitors C1 and C2, because it includes a P-type small vector, POO, which charges C2 and discharges C1, without an offsetting N-type small vector, which would charge C1 and discharge C2. In a typical space vector modulation diagram, sector 201 may include an N-type small vector, ONN, to balance the P-type small vector, POO. However, the small vector ONN was excluded from the diagram 200 in order to reduce common mode voltage at the inverter. To simultaneously balance capacitors C1 and C2 and reduce the common mode voltage, a state of the opposite type may be used. In this case, an N-type small vector may be used to offset the P-type small vector, POO.

The controller 160 may control the inverter 106 by providing sets of switching signals to the switching devices based, at least in part, on a position of a reference vector $V_{ref}$ in the space vector diagram 200 of FIG. 2. Specifically, when the controller 160 and inverter 106 are operating, the reference vector $V_{ref}$ may continuously cycle at the line frequency, typically 50 Hz or 60 Hz, in a counter-clockwise manner. The sampling frequency of $V_{ref}$ is typically identical to the switching frequency, which may range from 3 kHz to 20 kHz. During each switching period, usually at the beginning of each switching period, the position of $V_{ref}$ may be sampled and $V_{ref}$ will be considered fixed for the remainder of the switching period. Because $V_{ref}$ cycles at the line frequency, which is slower than the sampling and switching frequencies, $V_{ref}$ may remain in a given sector for several switching periods before exiting one sector and entering another. Accordingly, a set of switching signals may be identified for each sector. During the switching period, the controller 160 may provide at least one set of switching signals associated with the appropriate sector to the switching devices.

Active balance control under the present invention may be achieved by sampling $V_{ref}$'s is position to determine the sector in which the reference vector is located, creating one or more sets of switching signals based on that sector, and applying the one or more sets of switching signals created from the one or more sets of switching states to balance C1 and C2. A first set of switching signals may be created from the switching states corresponding to the vectors adjacent to the sector where $V_{ref}$ is located. The vectors corresponding to higher voltage switching states may be eliminated from the set of adjacent vectors, according to the present invention. In certain embodiments, a complementary set of switching signals may be created by substituting a non-adjacent small vector of one type in the first set of switching signals for an adjacent small vector of the opposite type to create a second set. One example would be to replace an adjacent N-type small vector in the set of adjacent vectors with a non-adjacent P-type small vector to create a second set. This embodiment is applicable, but not limited, to sectors 201, 203, 204, 206, 207, 209, 210, 212, 213, 215, 216, and 218 of FIG. 2. A second example of these steps may be applied to sector 201, where the adjacent vectors comprise PON, PNN, and P-type small vector POO after elimination of higher voltage vector ONN. Because POO is the only small vector in the set comprising the vectors adjacent to sector 201, the set may be used to create P-type sequences including those shown in FIGS. 13A and 13B. Substituting a non-adjacent N-type small vector, such as ONO, for P-type small vector POO may create a second set comprising vectors PON, PNN, and N-type small vector ONO, which may be used to create a N-type sequences including those shown in FIGS. 13C and 13D.

Figure 14C:
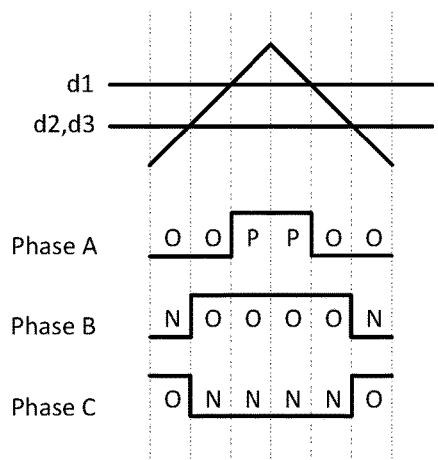
Figure 14D:
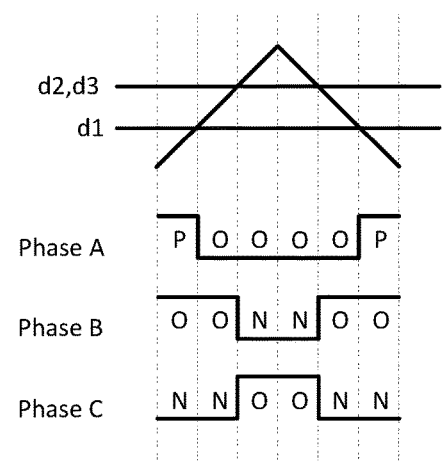
Figure 15A:
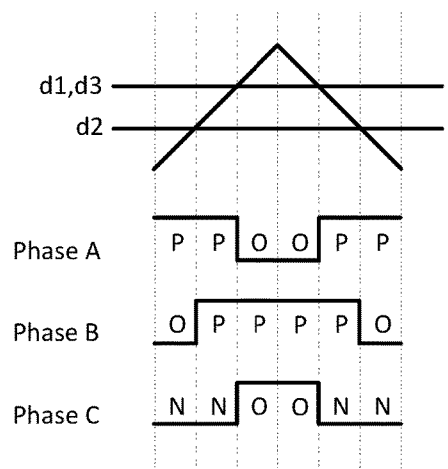
Figure 15B:
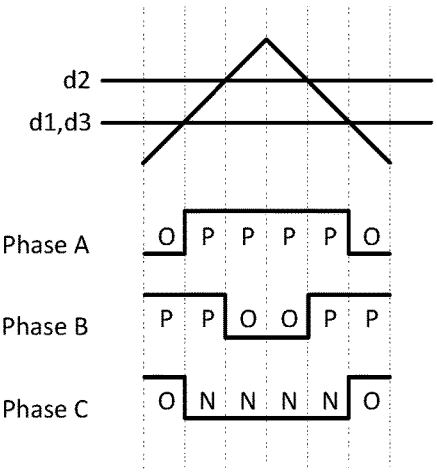
Figure 15C:
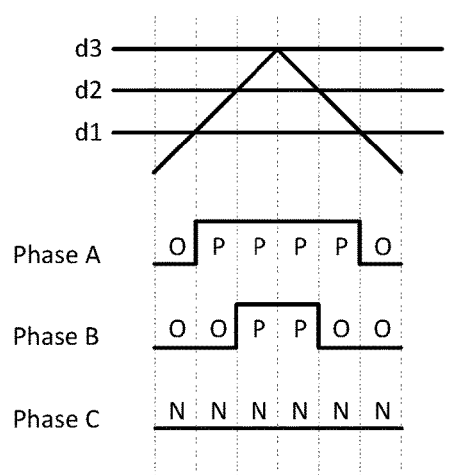
Figure 15D:
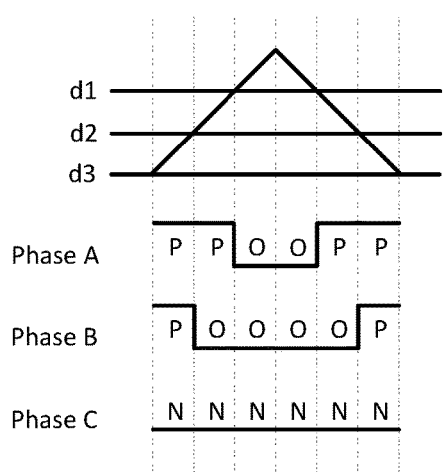
Figure 16A:
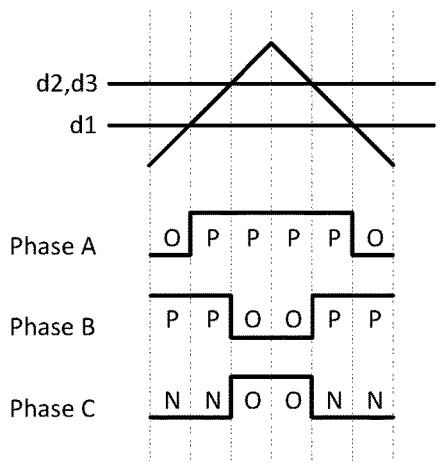
Figure 16B:
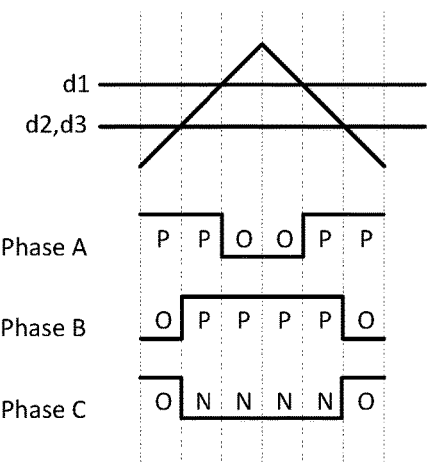
Figure 16C:
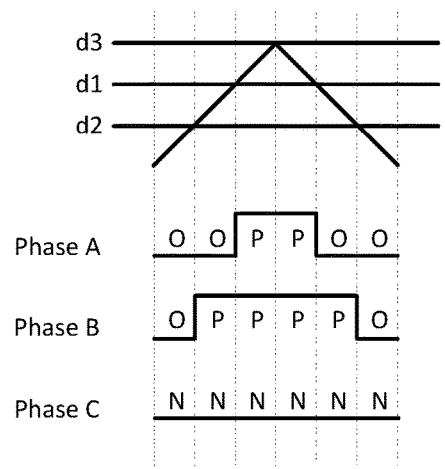
Figure 16D:
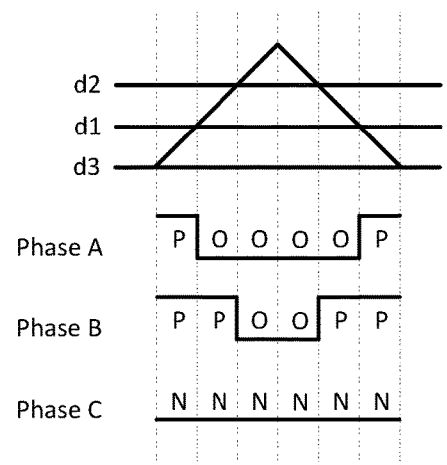
Figure 17A:
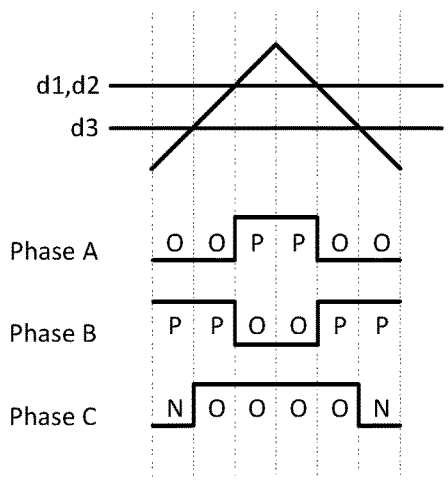
Figure 17B:
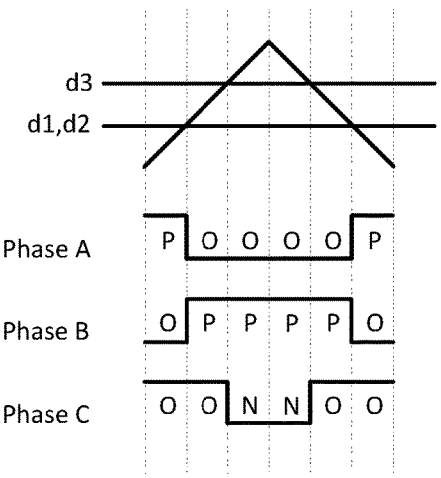
Figure 17C:
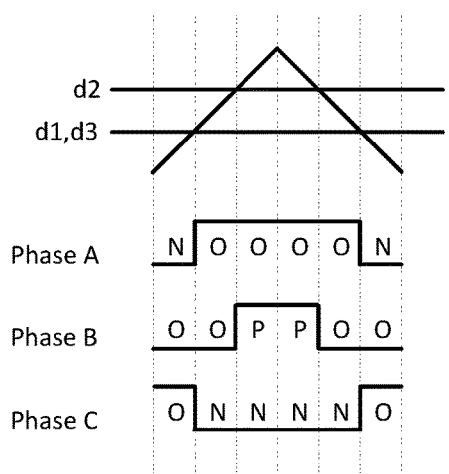
Figure 17D:
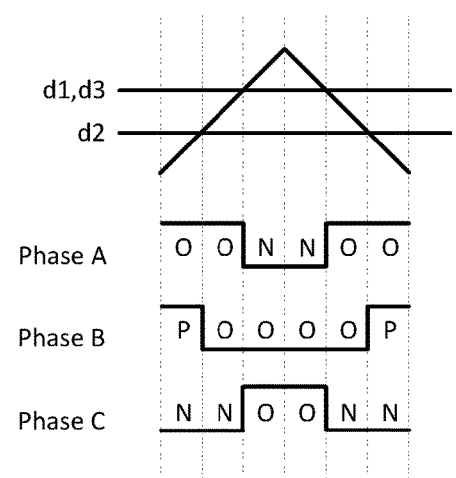
Figure 18A:
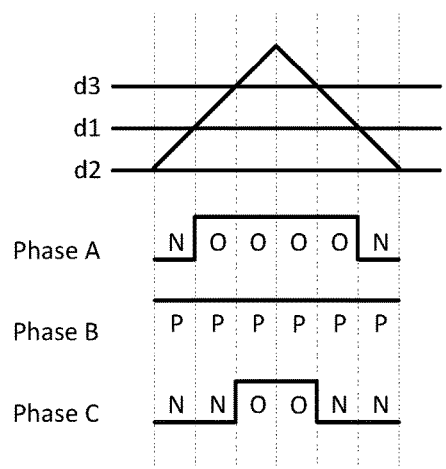
Figure 18B:
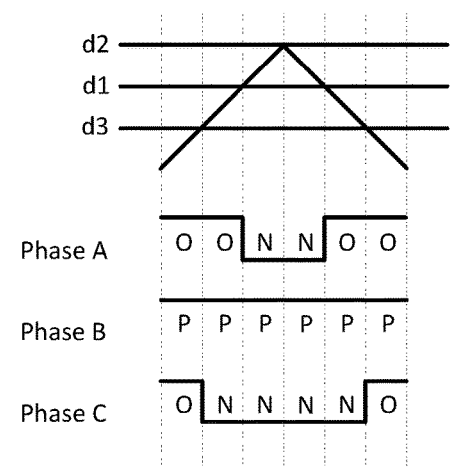
Figure 18C:
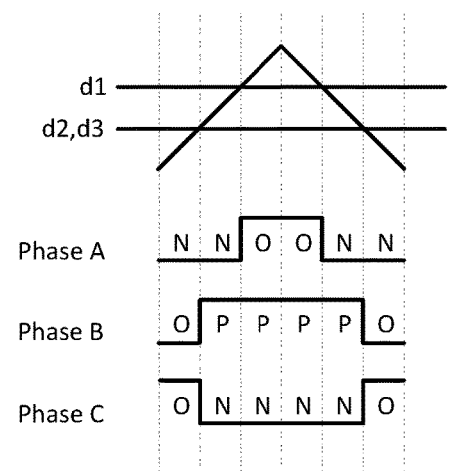
Figure 18D:
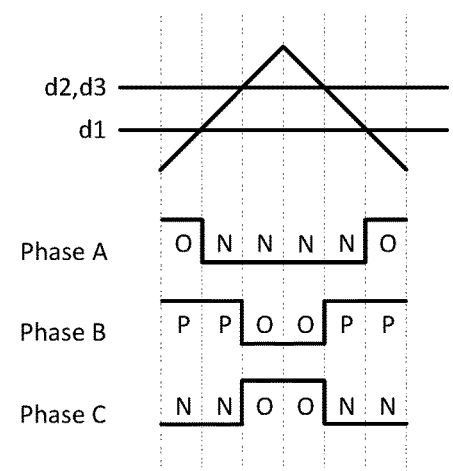
Figure 19A:
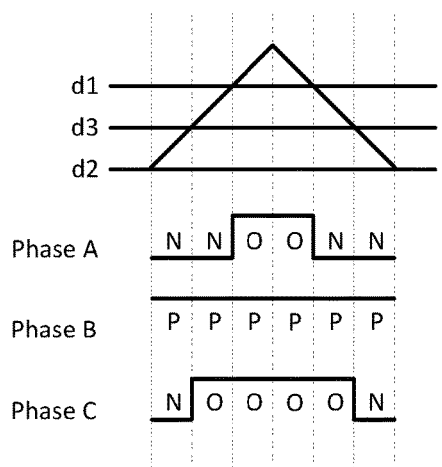
Figure 19B:
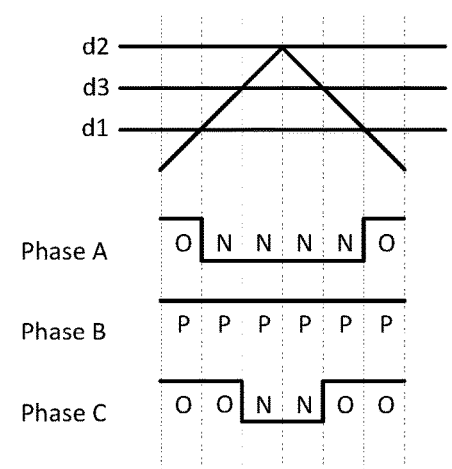
Figure 19C:
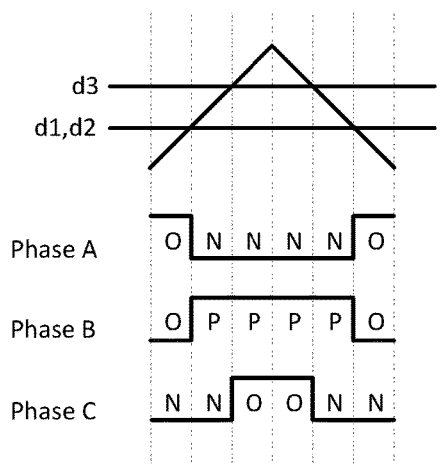
Figure 19D:
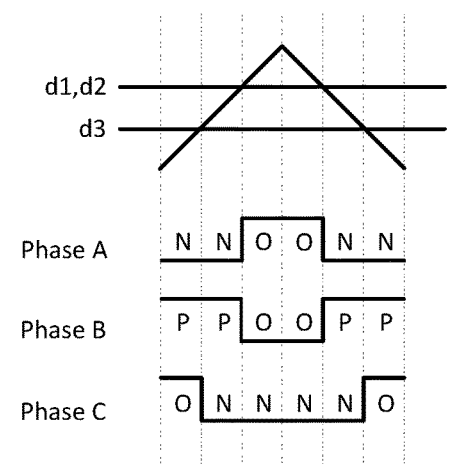
Figure 20A:
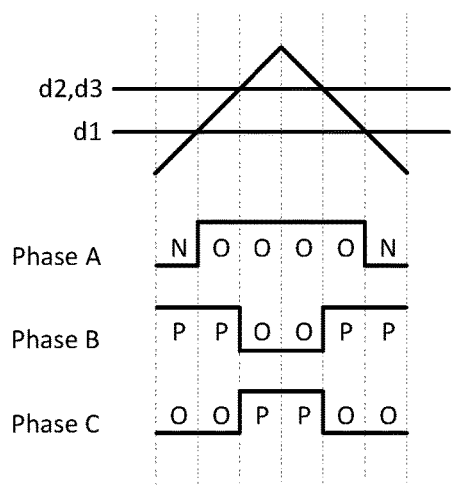
Figure 20B:
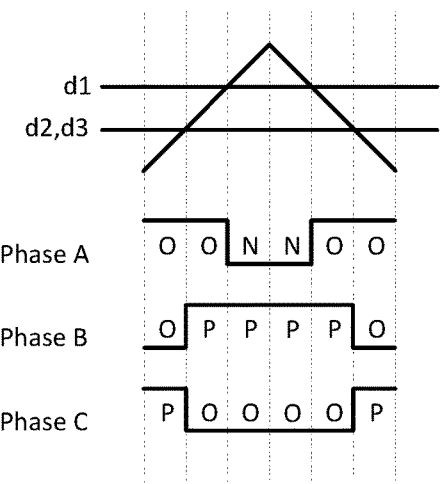
Figure 20C:
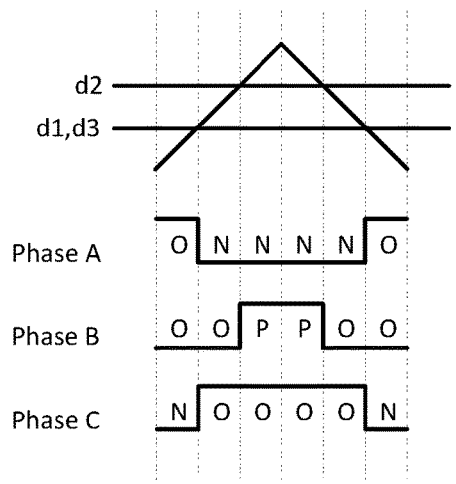
Figure 20D:
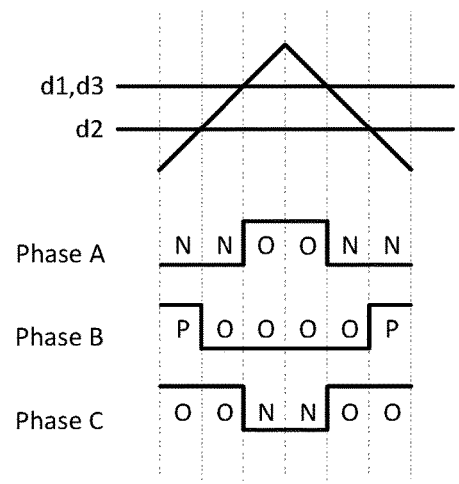
Figure 21A:
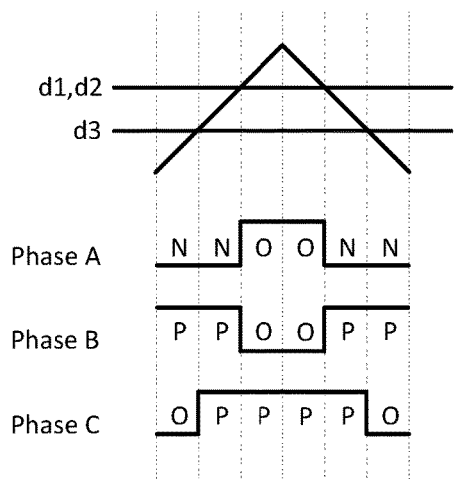
Figure 21B:
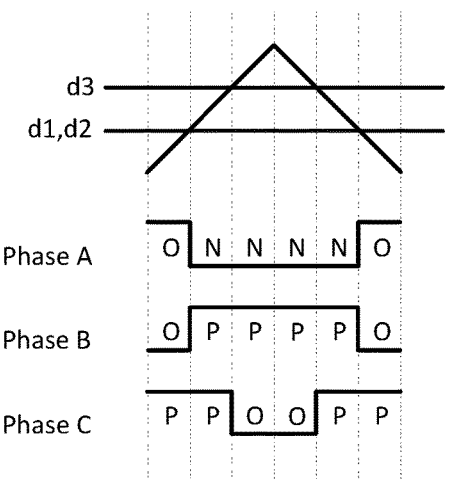
Figure 21C:
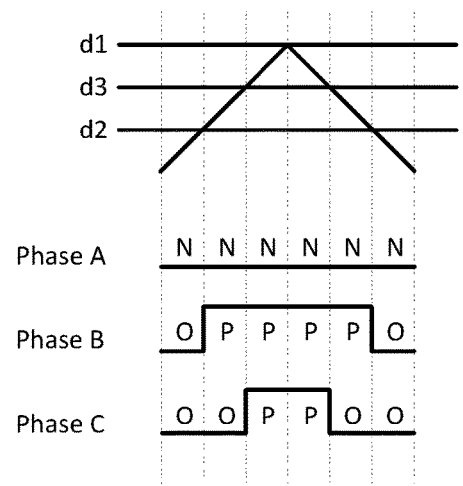
Figure 21D:
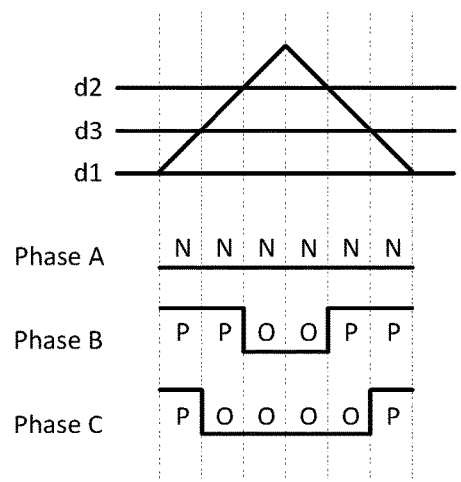
Figure 22A:
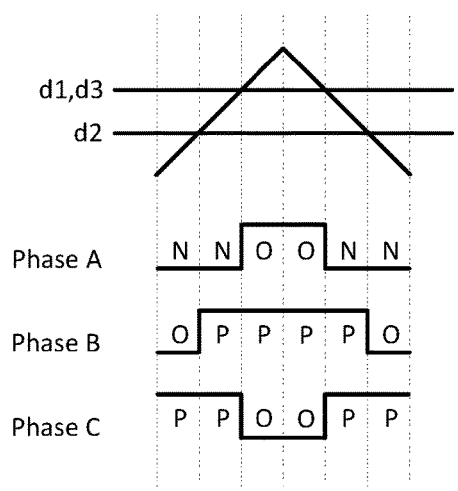
Figure 22B:
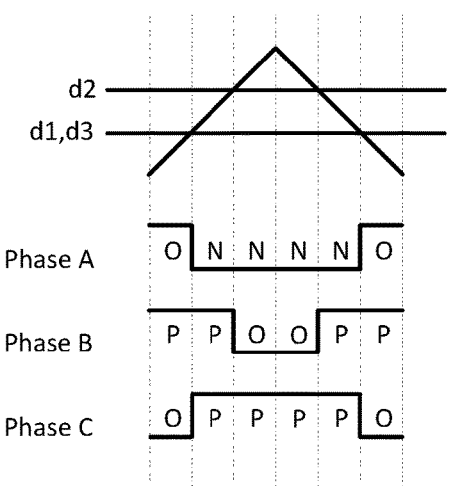
Figure 22C:
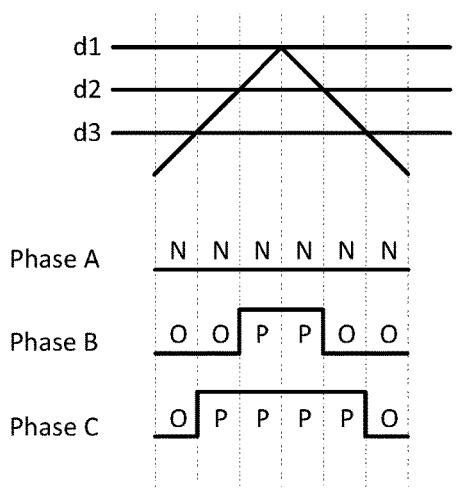
Figure 22D:
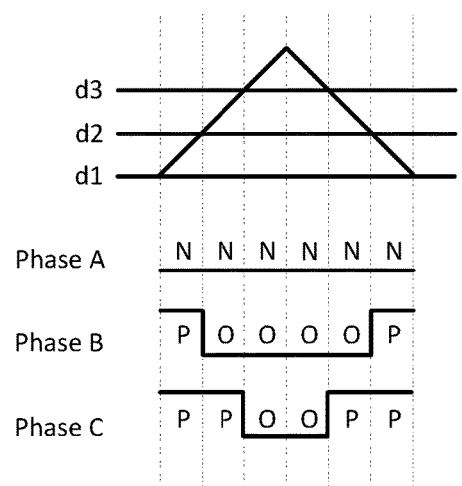
Figure 23A:
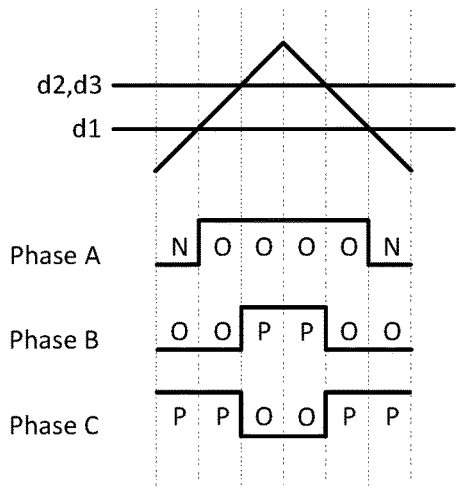
Figure 23B:
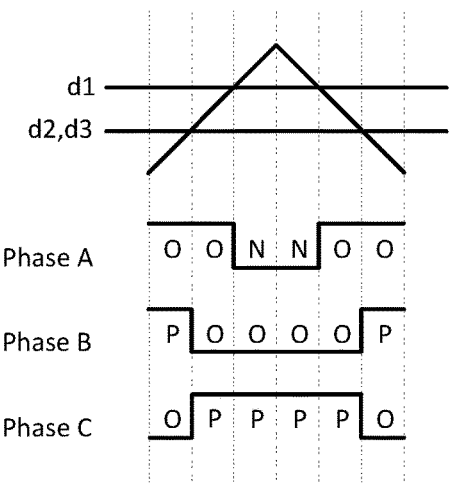
Figure 23C:
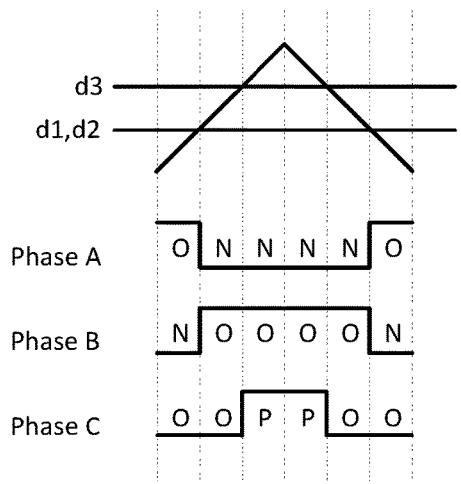
Figure 23D:
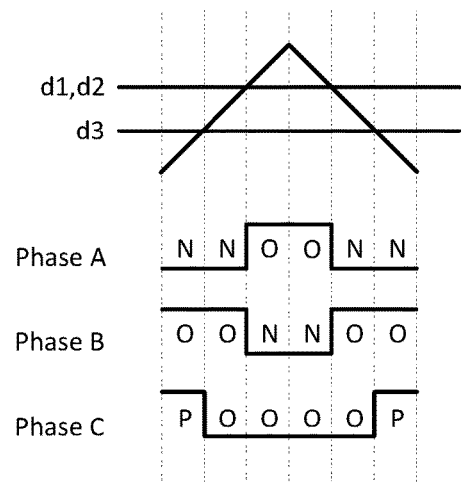
Figure 24A:
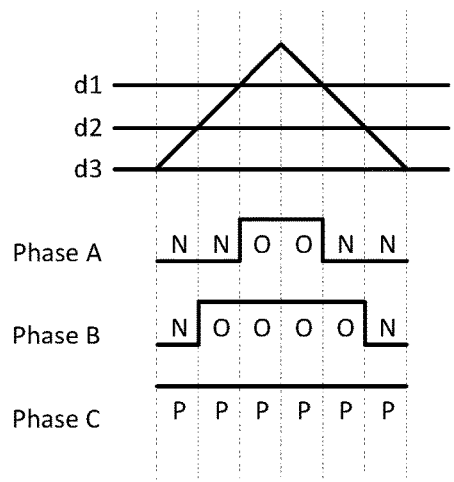
Figure 24B:
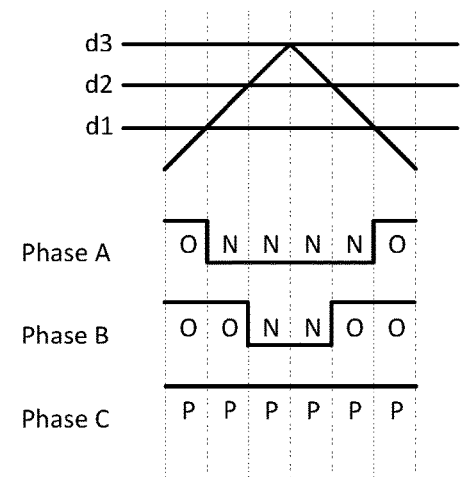
Figure 24C:
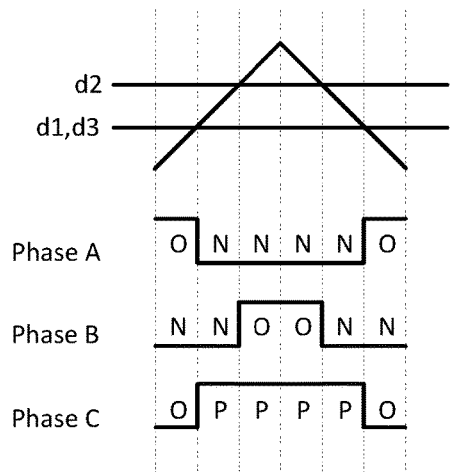
Figure 24D:
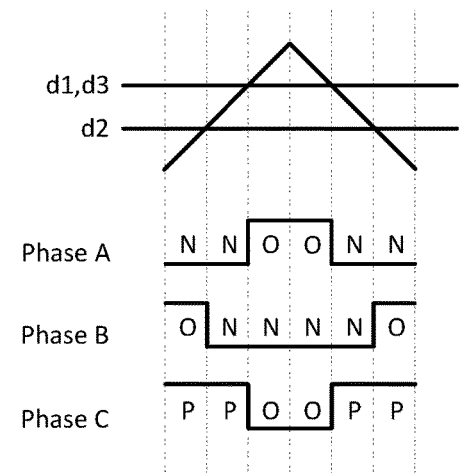
Figure 25A:
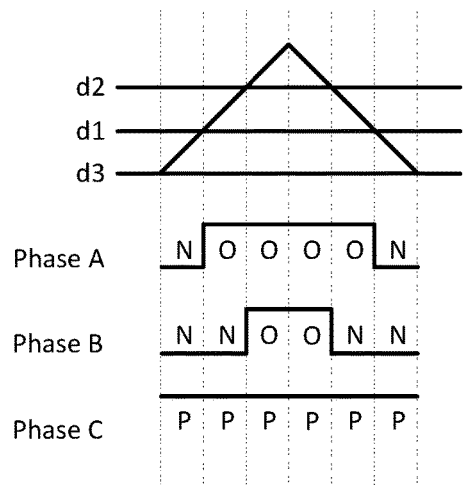
Figure 25B:
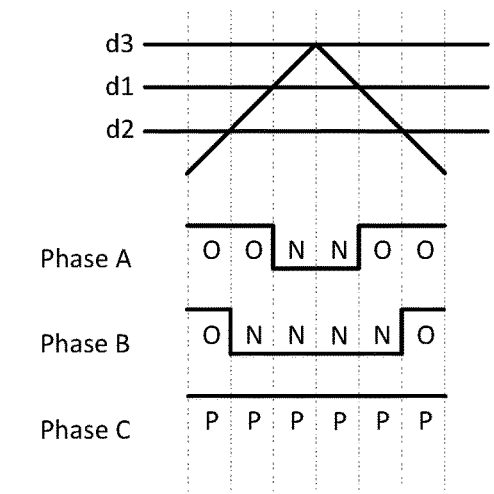
Figure 25C:
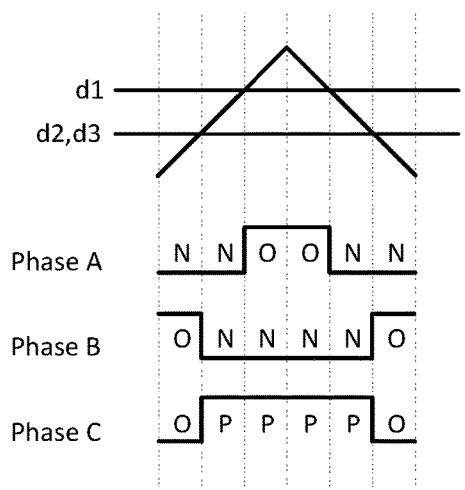
Figure 25D:
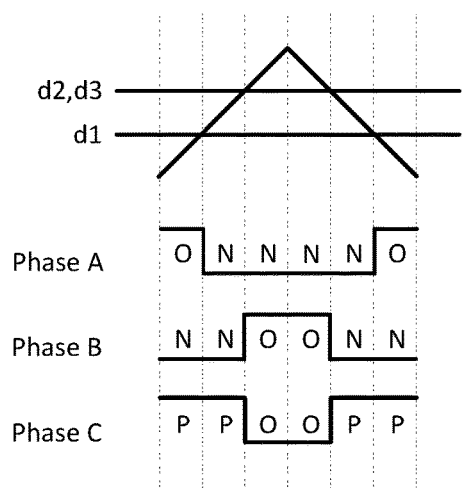
Figure 26A:
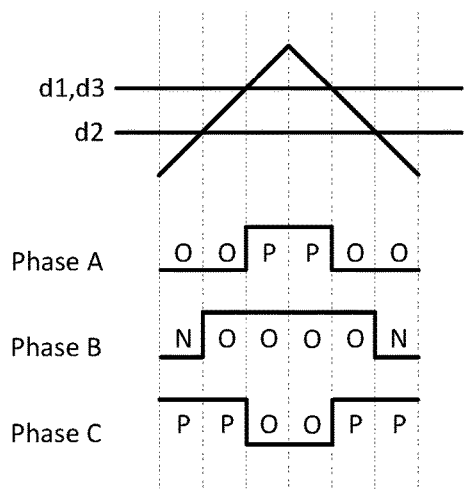
Figure 26B:
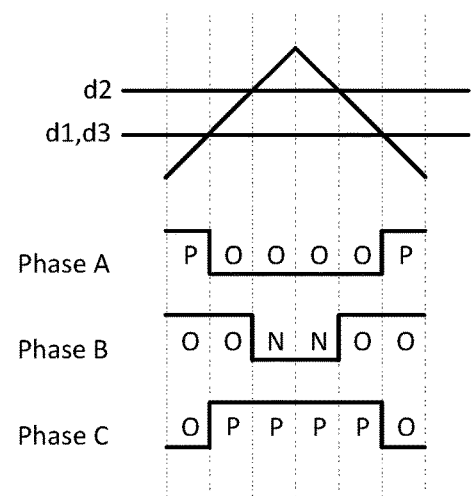
Figure 26C:
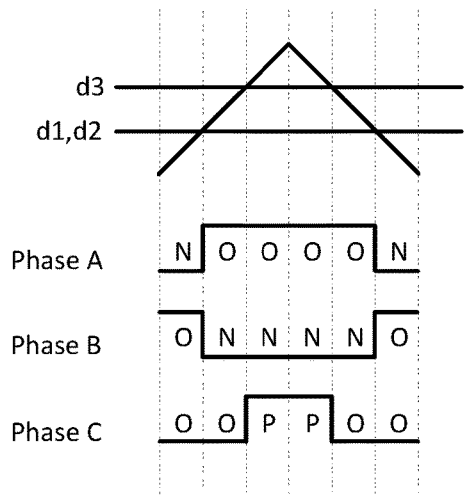
Figure 26D:
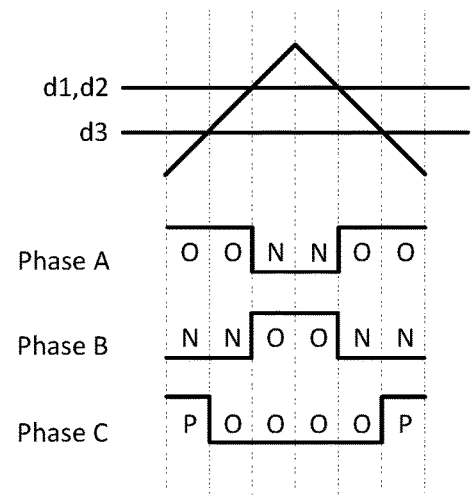
Figure 27A:
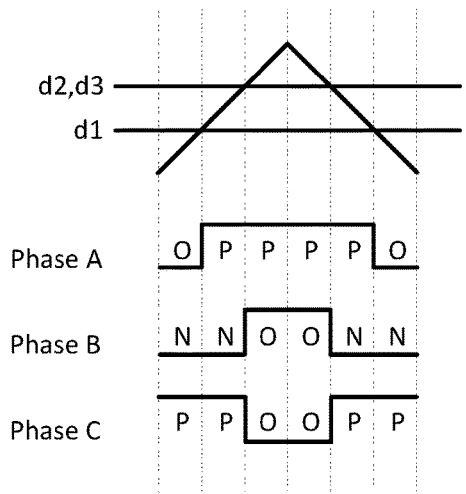
Figure 27B:
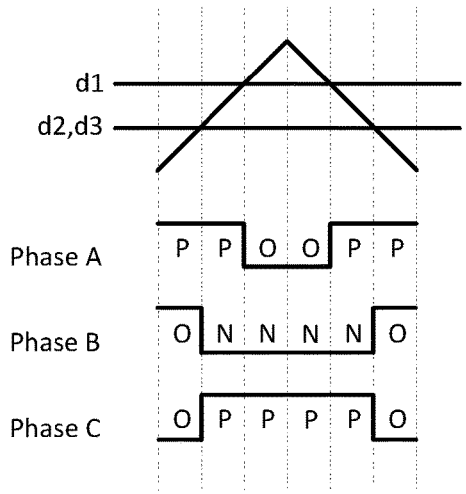
Figure 27C:
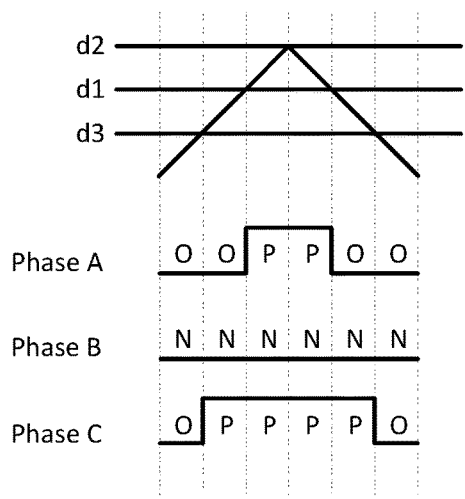
Figure 27D:
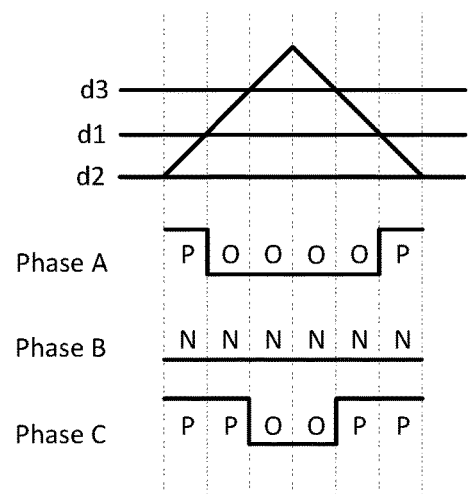
Figure 28A:
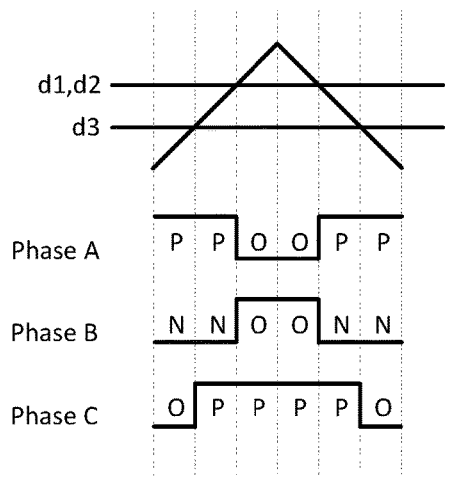
Figure 28B:
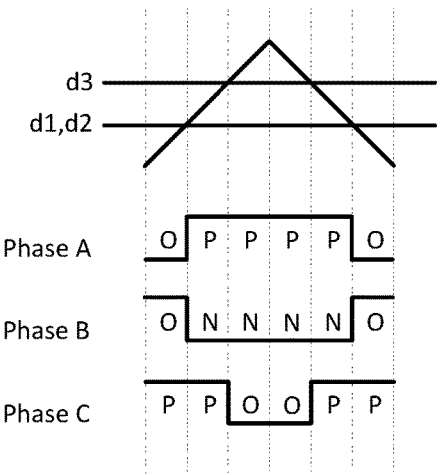
Figure 28C:
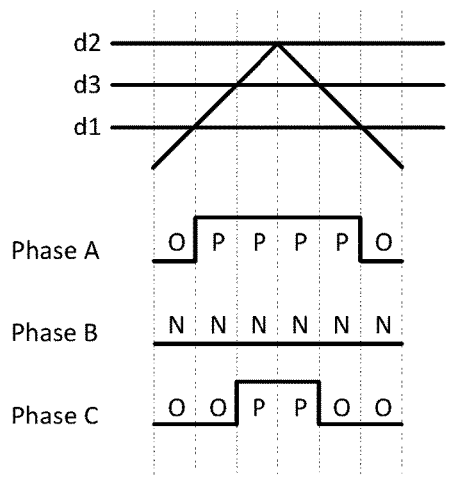
Figure 28D:
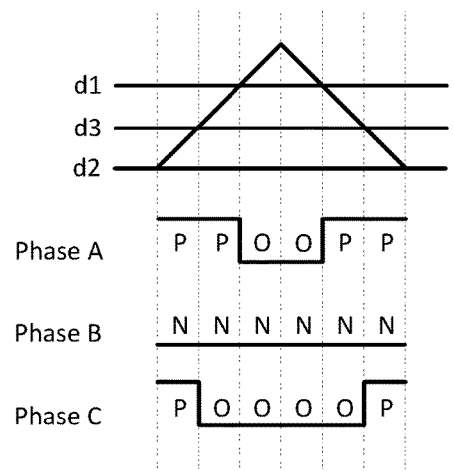
Figure 29A:
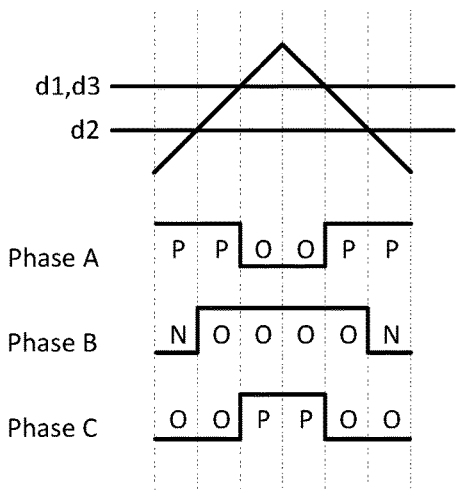
Figure 29B:
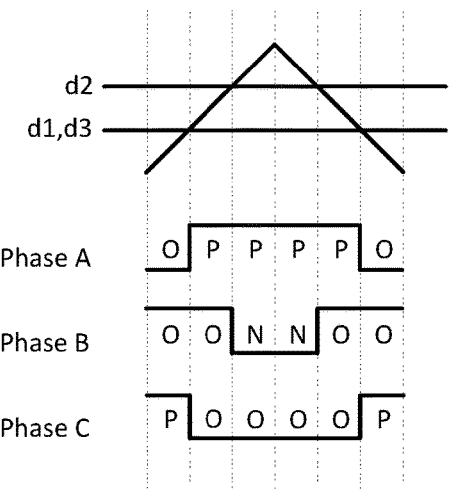
Figure 29C:
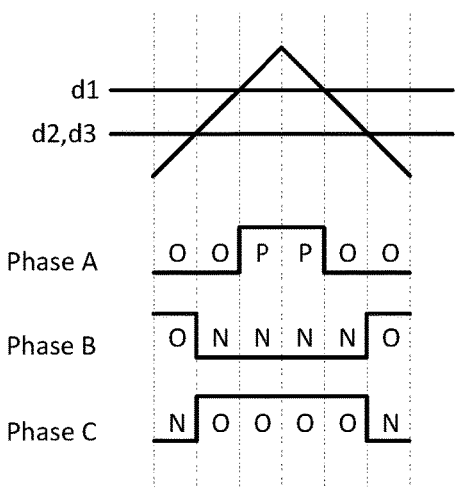
Figure 29D:
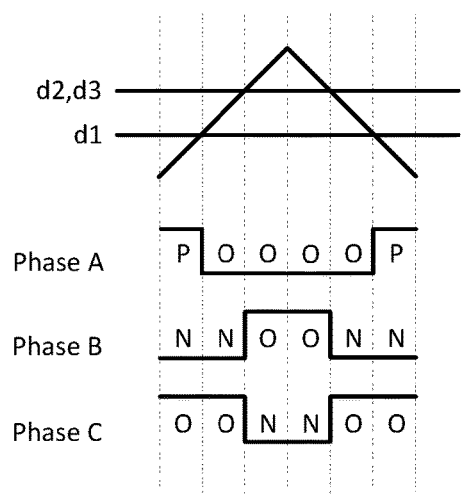
Figure 30A:
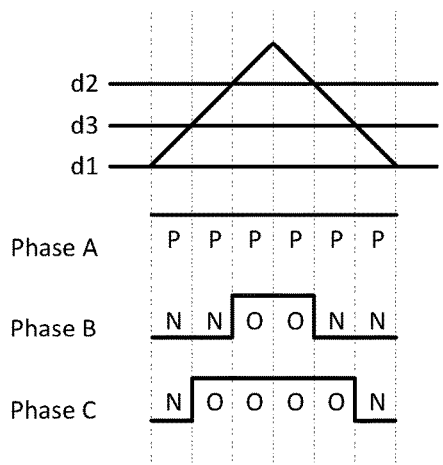
Figure 30B:
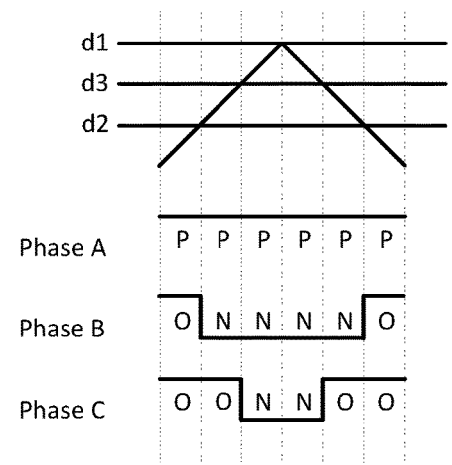
Figure 30C:
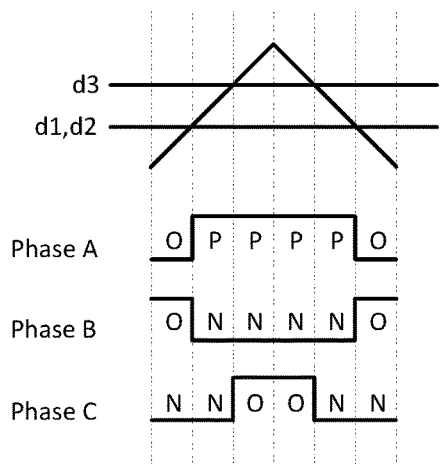
Figure 30D:
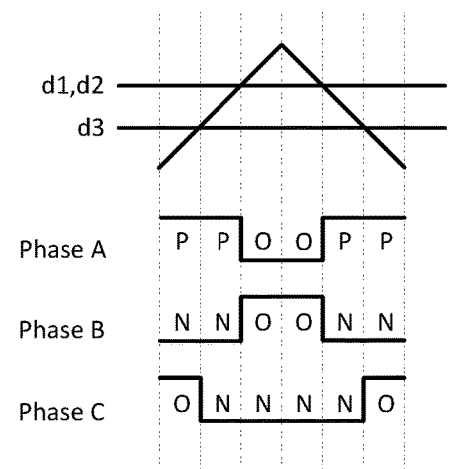
Figure 31A:
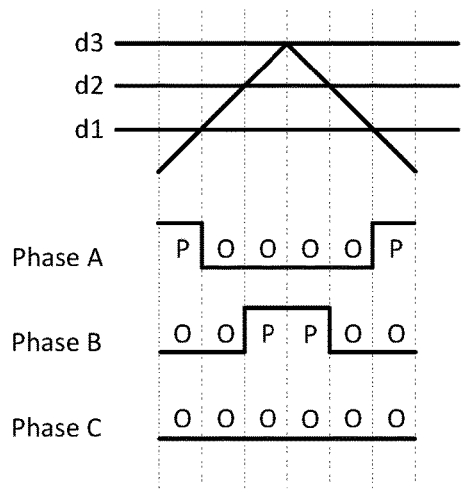
Figure 31B:
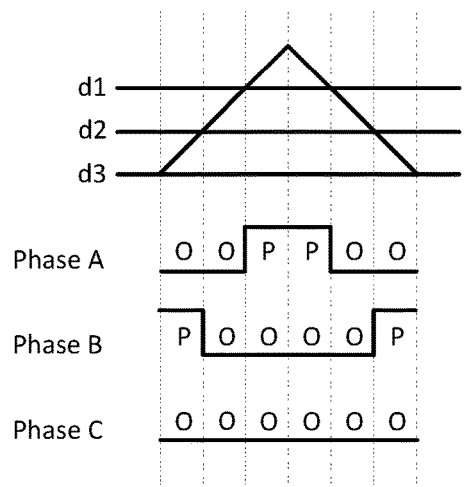
Figure 31C:
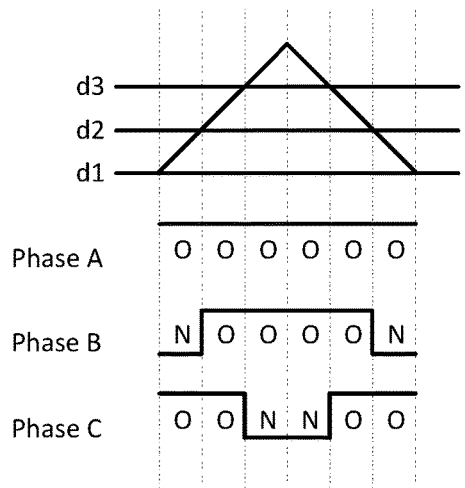
Figure 31D:
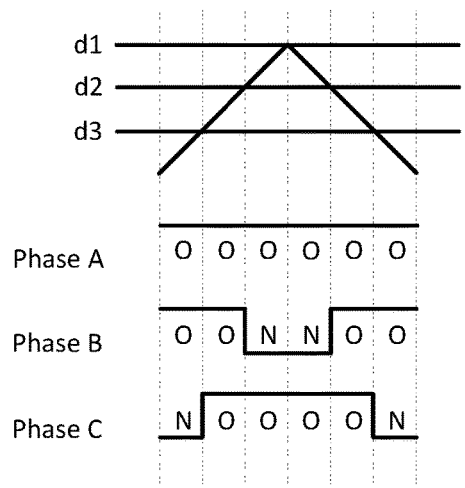
Figure 32A:
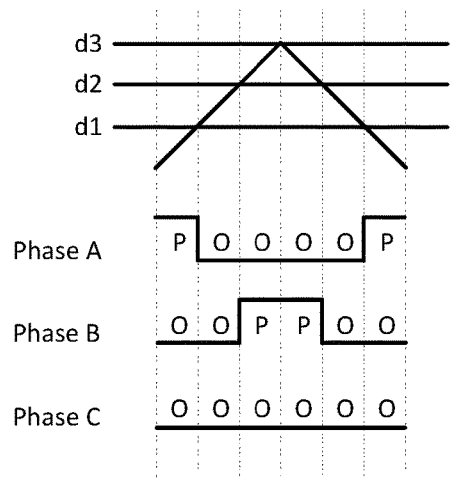
Figure 32B:
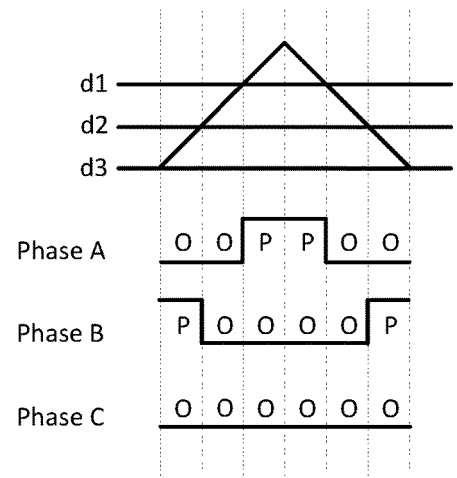
Figure 32C:
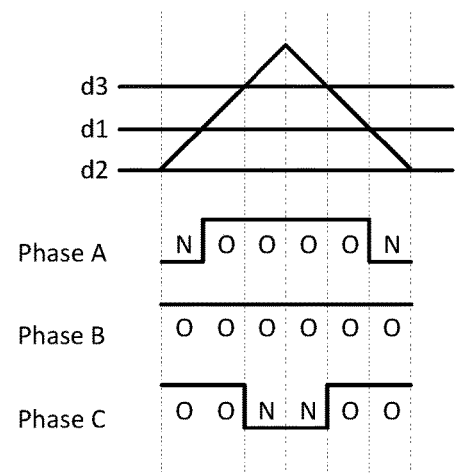
Figure 32D:
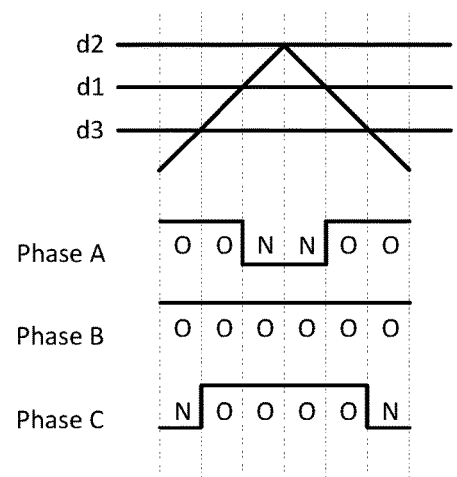
Figure 33A:
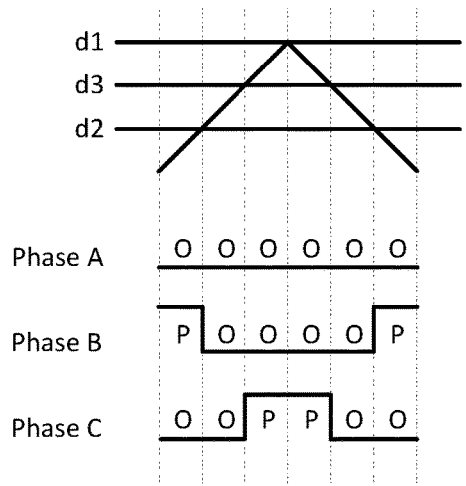
Figure 33B:
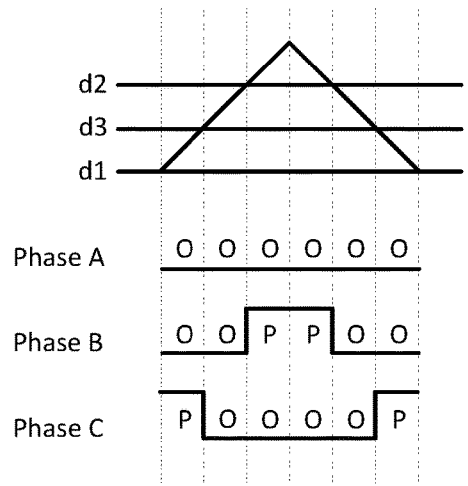
Figure 33C:
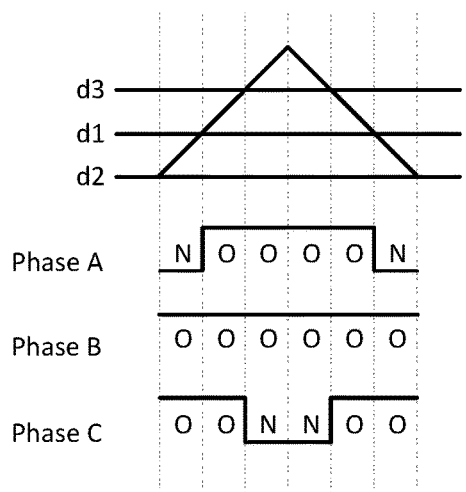
Figure 33D:
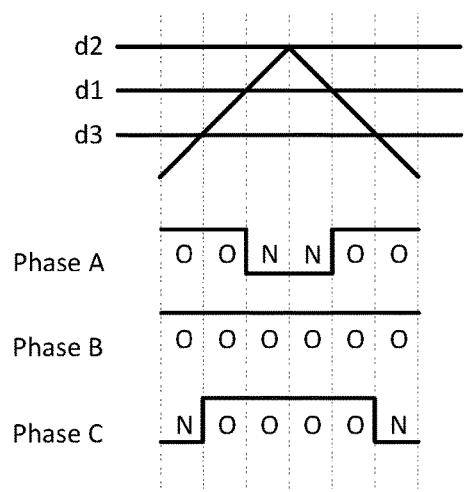
Figure 34A:
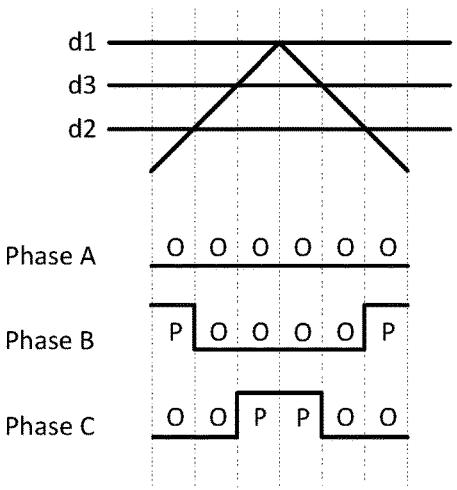
Figure 34B:
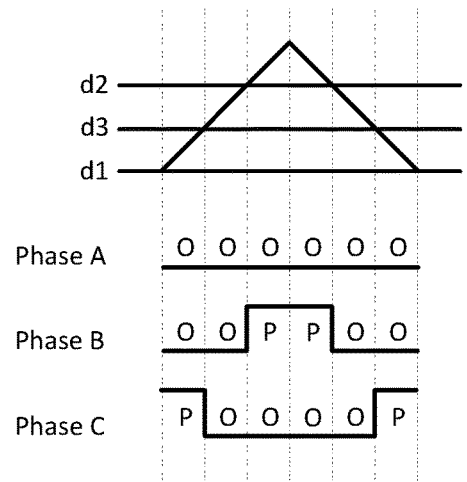
Figure 34C:
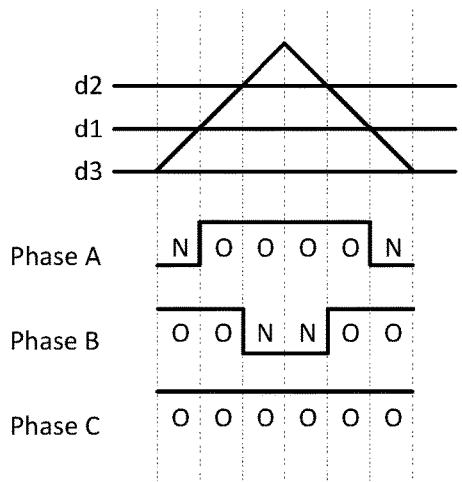
Figure 34D:
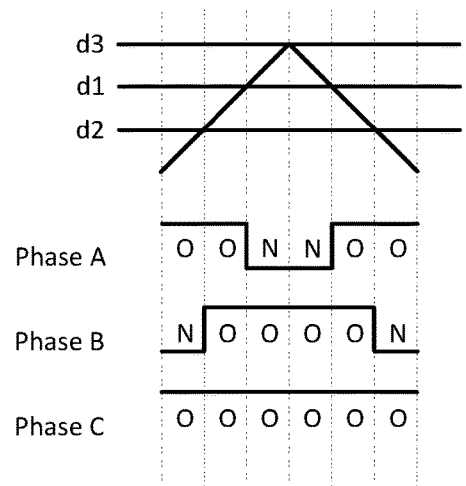
Figure 35A:
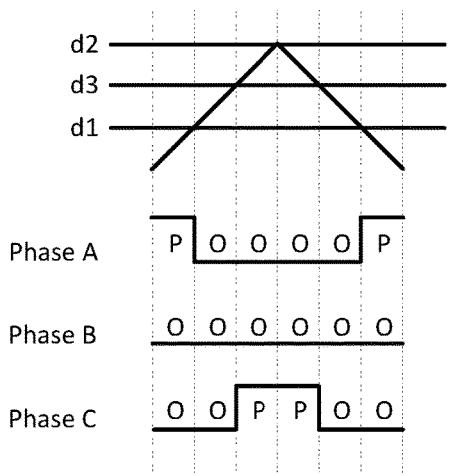
Figure 35B:
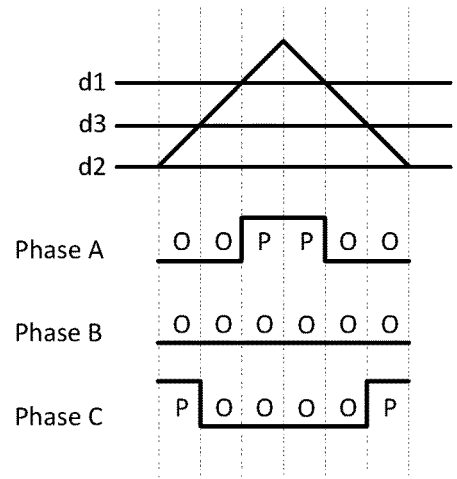
Figure 35C:
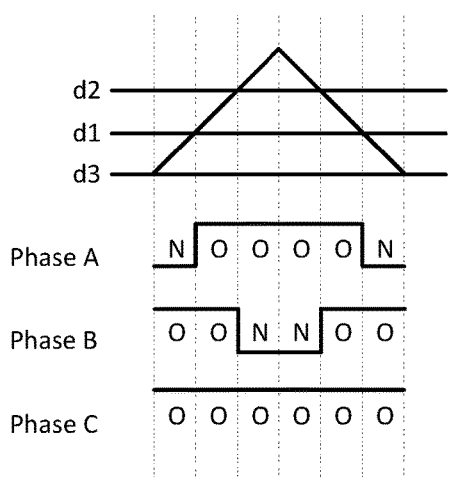
Figure 35D:
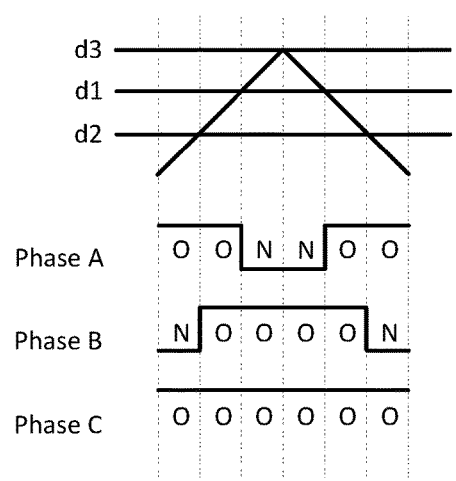
Figure 36A:
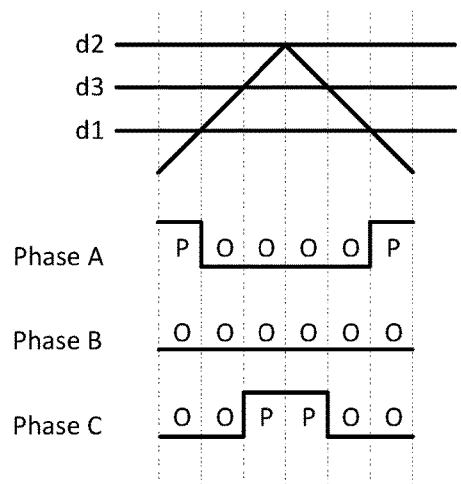
Figure 36B:
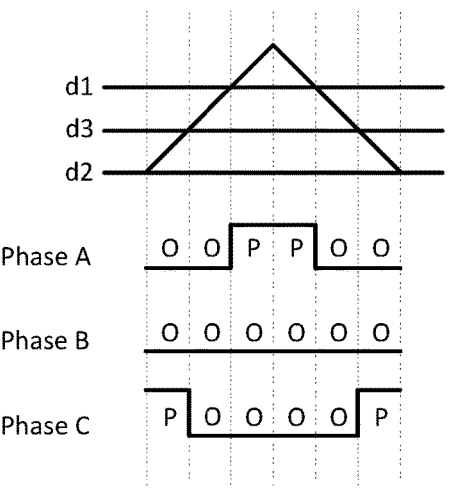
Figure 36C:
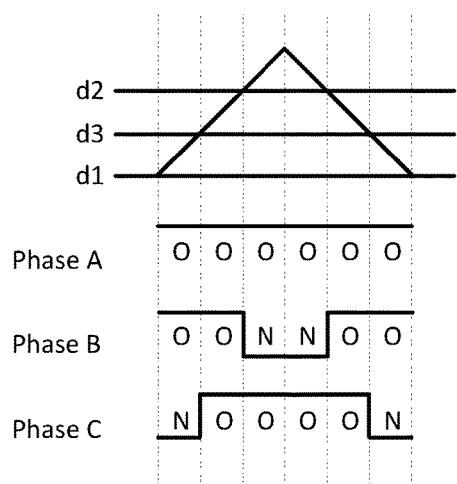
Figure 36D:
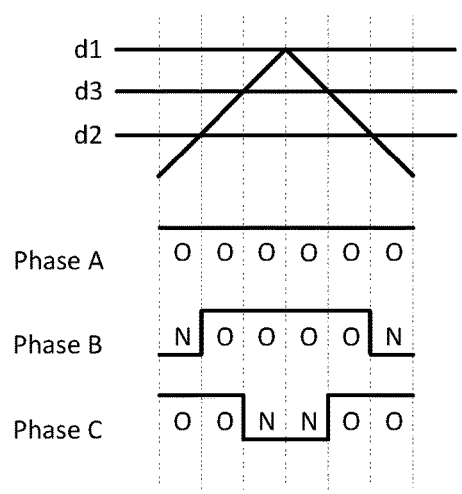

In other embodiments, the set of switching signals created from the switching states corresponding to the vectors adjacent to the sector where $V_{ref}$ is located may comprise two small vectors. In this embodiment, the small vectors may be of opposing types, where one small vector may be a P-type vector and the other vector may be an N-type vector. Therefore, to create P-type sequences of switching signals, a second, and non-adjacent, P-type vector may replace the N-type small vector in the original set, so that the new set comprises only P-type small vectors. Similarly, to create N-type sequences of switching signals, a second, and non-adjacent, N-type vector may replace the P-type vector in the original set, so that the new set comprises only N-type small vectors. This embodiment is applicable, but not limited, to sectors 202, 205, 208, 211, 214, 217, and 219-224 of FIG. 2. For example, in sector 202, an original set of adjacent vectors may comprise PON, N-type small vector OON, and P-type small vector POO, after elimination of higher voltage vectors PPO and ONN. To create P-type sequences from a first set of vectors, the N-type small vector OON in the original set may be replaced by a non-adjacent P-type small vector, such as OPO, to create a first set comprising vectors PON, POO, and OPO. Two example P-type sequences are shown in FIGS. 14A and 14B. Similarly, N-type sequences may be created from a second set of vectors, where the second set of vectors is created by replacing P-type small vector POO in the original set with a non-adjacent N-type small vector, such as ONO, to create a second set comprising vectors PON, OON, and ONO. Two example N-type sequences are shown in FIGS. 14C and 14D.

Like P- and N-type switching states that comprise switching sequences, P-type and N-type sequences are desirable to balance the voltage across the capacitors C1 and C2 in FIG. 1. A P-type sequence may be desirable when the voltage across C1 is greater than the voltage over C2, because P-type vectors discharge C1 and charge C2. An N-type sequence may be desirable when the voltage across C1 is less than the voltage over C2, because N-type vectors charge C1 while discharging C2. The controller may, therefore, apply P-type and N-type sequences when appropriate to balance the voltages across the capacitors.

In certain embodiments, the switching state sequence may be altered to reduce the switching frequency effects and facilitate a simplified PWM algorithm to resolve the problems introduced by the substitution illustrated in FIGS. 3A-B. Resequencing a sequence of switching states may eliminate an increase in inverter switching frequency created by substitution of an alternative switching state and enable implementation using a simple PWM algorithm. FIGS. 4A and 4B illustrate resequencing the sequence of switching states after the high common mode voltage switching state has been replaced by a lower common mode voltage switching state as shown in FIGS. 3A-B. The PNN switching states of FIG. 4A are grouped in the middle of the switching period in FIG. 4B. By resequencing the switching states, phases A, B, and C once again change phases only once during the switching period. Furthermore, the phases may be implemented using modulation waveform 452. Note that the duty cycles of FIG. 4B have been inverted as compared with the duty cycles of FIG. 4A and the modulation waveform has been translated to enable implementation via the simple PWM algorithm. Accordingly, resequencing the sequence of switching states enables implementation via a simple modulation waveform and reduces the inverter switching frequency, while retaining the benefits of a lower common mode voltage as described above.

Figure 5A:
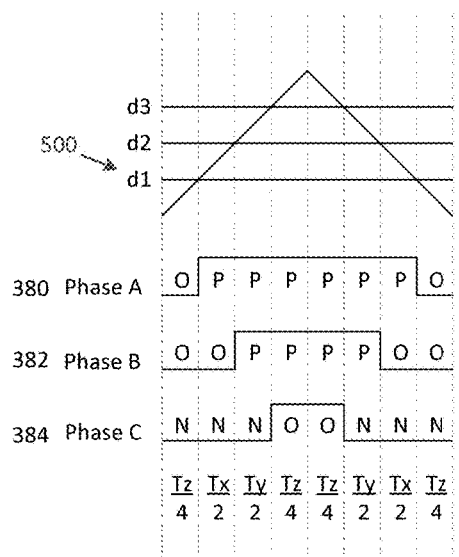
Figure 5B:
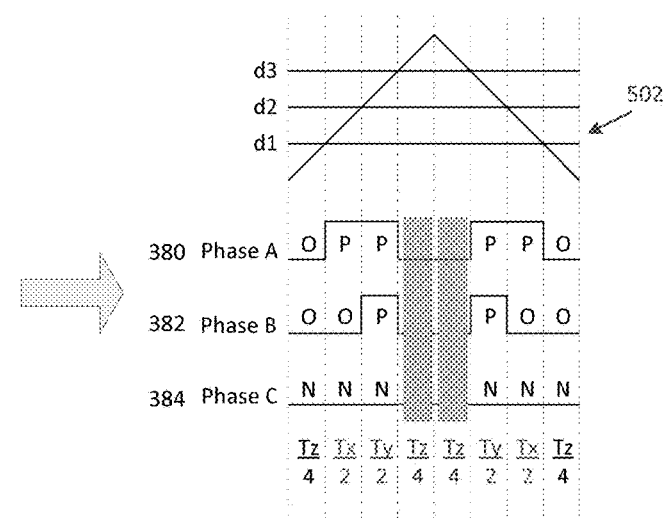
Figure 6A:
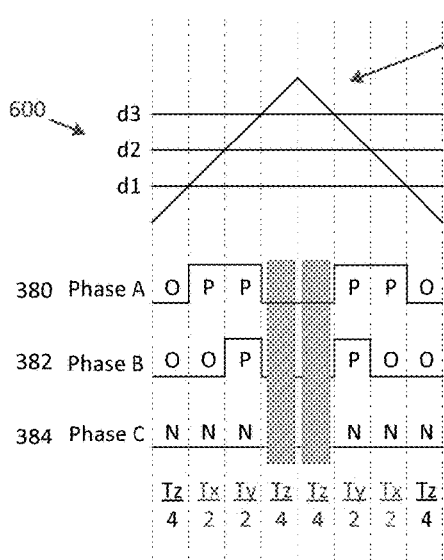
Figure 6B:
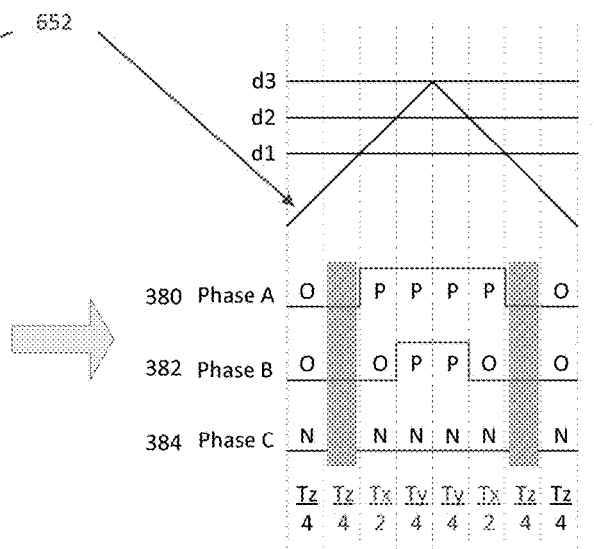

FIGS. 5A-B and 6A-B illustrate a second example process of substitution and resequencing. Switching state PPO in FIG. 5A is replaced by switching state OON to create FIG. 5B. FIG. 6A may be resequenced to create FIG. 6B by moving the ONN switching states to the beginning and end of the switching period to reduce the inverter switching frequency. Shifting the duty cycles d1, d2, and d3 enables implementation of the sequence of switching states using triangular modulation waveform 652.

FIGS. 13-36 each illustrate a set of switching states associated with a particular sector. The figures further illustrate that a sequence of switching states may be resequenced to enable implementation via a triangular modulation waveform, as discussed above, and reduce the inverter switching frequency. For example, FIG. 13A illustrates a P-type active-high implementation of the PWM algorithm, in which both POO switching states are applied during the middle of the switching period. In contract, FIG. 13B illustrates a second P-type sequence of the switching states applied in FIG. 13A in which one switching state POO is applied at the beginning of the switching period and the second is applied at the end of the switching period. Note also that FIG. 13B illustrates an active-low implementation of the PWM algorithm. Further note, FIGS. 13C-D illustrate active-high and active-low implementations, respectively, of an N-type sequence associated with sector 201 of FIG. 2. The controller may implement active-high and active-low implementations to smooth transitions between switching periods and as $V_{ref}$ transitions between sectors. It should be further appreciated that the specific switching states, resequencing, and modulation waveforms identified in FIGS. 3A-B, 4A-B, 5A-B, and 6A-B, and 13A-D through 36A-D are not intended to be limiting, as other switching states, orders, and modulation waveforms are possible within the scope of this disclosure. An N-type sequence may be created from a P-type sequence by substituting a P-type small vector with a N-type small vector, and vice versa. The initial P- or N-type small vector may be adjacent to a sector associated with the reference vector in diagram 200 of FIG. 2 and the substitution vector N- or P-type small vector may be non-adjacent to the sector associated with the reference vector.

Figure 7:
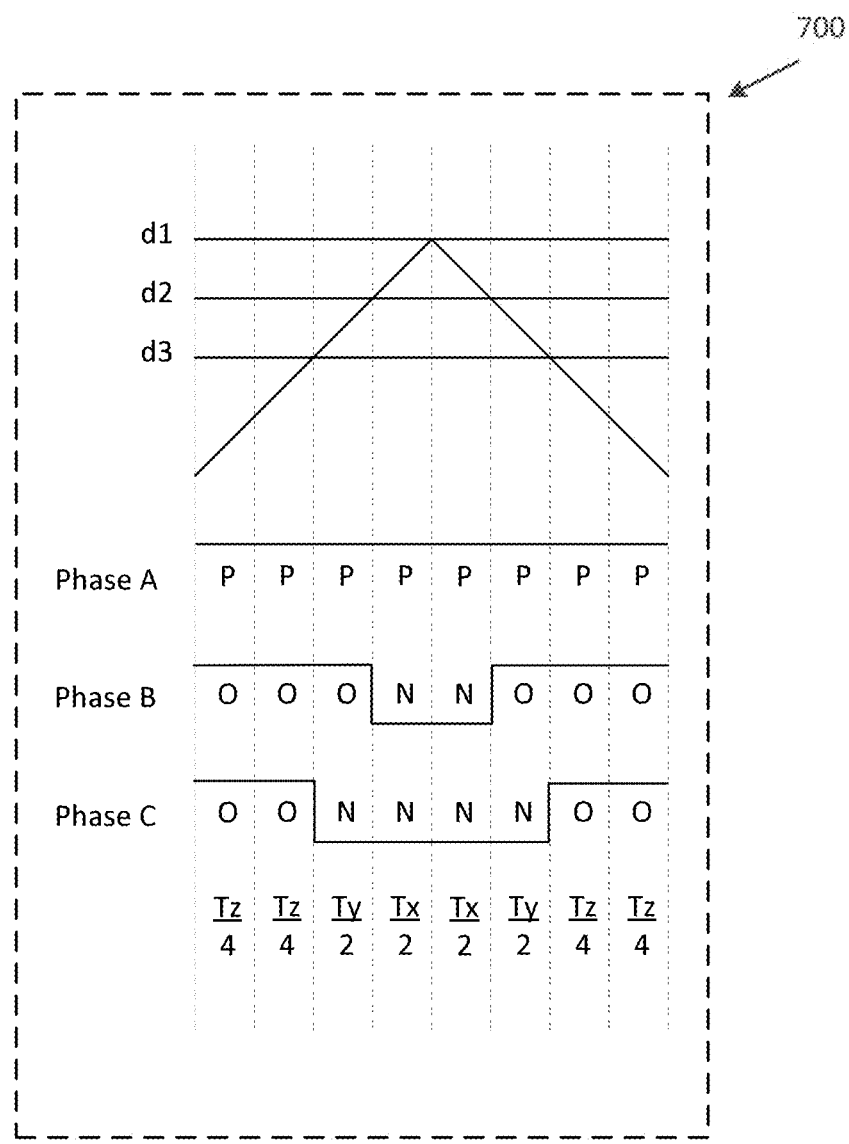
FIGS. 7-9 illustrate an example substitution of a non-adjacent small vector for an adjacent small vector to create a complementary pair of sequences applicable by the controller to balance the common mode voltage, according to aspects of the present disclosure.

FIG. 7 illustrates an example first sequence of switching states 700 corresponding to the position of the reference voltage depicted in FIG. 2, according to aspects of the present disclosure. It should be appreciated, however, that other sequences of switching states could be used for the position of the reference voltage depicted in FIG. 2, and other sequences of switching signals may be used for the other sectors in FIG. 2 as well as for space vector diagrams with a different configuration. Like FIG. 3, the rows of the sequences 700 correspond respectively to first, second, and third phases of an inverter. Similarly, the columns of the sequences 700 may correspond to switching intervals. Each individual entry within the rows and columns of the sequences 700 may identify the mode (e.g., P, O, or N) in which that corresponding level is operating during the corresponding time interval. The entries within each column of the sequences 300 may identify the switching state of the inverter at the corresponding switching interval.

As can be seen, the sequence 700 comprises three switching states within sector 201 in FIG. 2, POO, PON, and PNN. Although this sequence 700 may be used to cause an inverter to generate the modulated output identified at the top of FIG. 3, which will, in turn, produce the necessary AC output at the AC connection, the sequence 700 may upset the voltage balance between DC bus capacitors of the inverter because it includes a P-type small vector POO without an offsetting N-type small vector. In a typical space vector modulation diagram, the sector 201 would include an N-type small vector ONN corresponding to the P-type small vector POO that could be used to maintain balance. As stated above, however, the small vector ONN was excluded from the space vector diagram 200 in order to reduce common mode voltage at the inverter.

Figure 8:
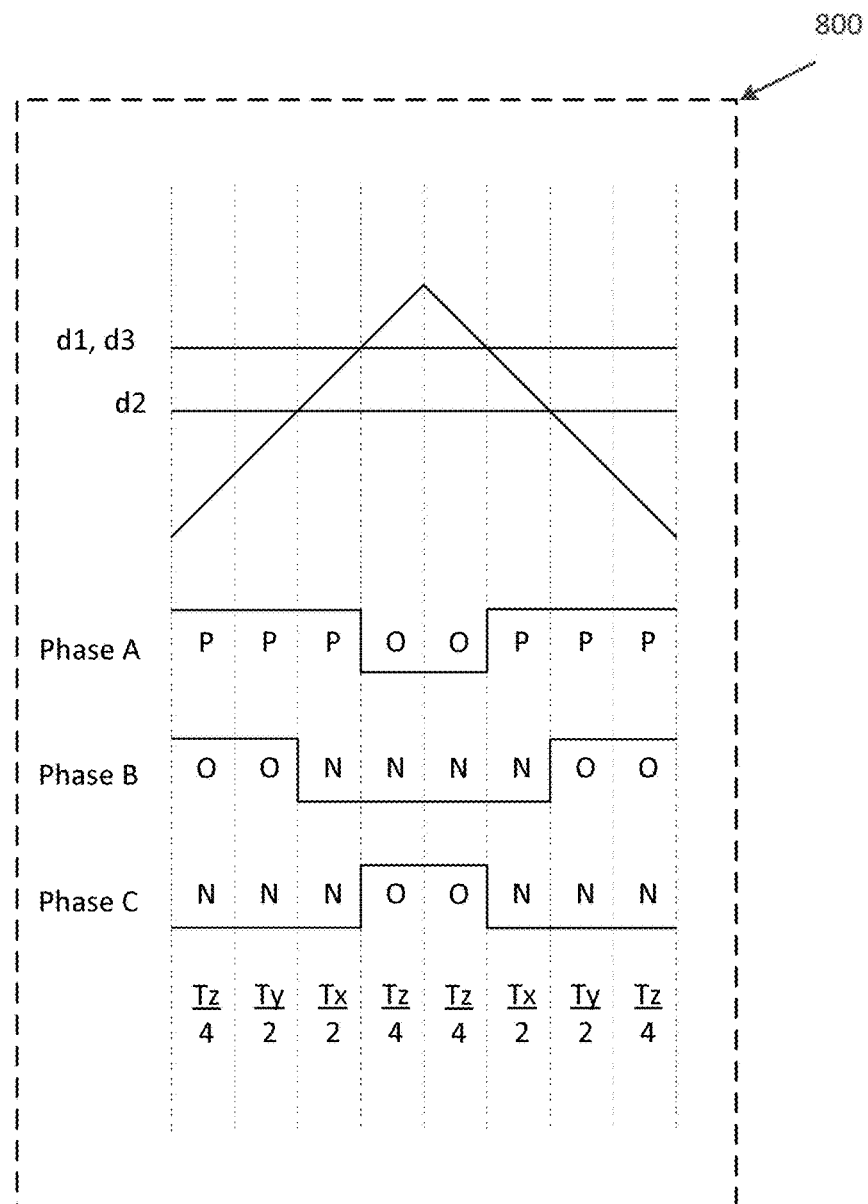

To balance the common mode voltage, a small vector from a different sector that represents a switching state of an opposite type may be selected and the associated switching state used within the second sequence of switching states. FIG. 8 illustrates an example second sequence of switching states 800 corresponding to the position of the reference voltage depicted in FIG. 2, according to aspects of the present disclosure. As depicted, the sequence 800 comprises the PON medium vector and PNN large vector that at least partially define sector 201 in FIG. 2, but includes the small vector ONO, which is not adjacent to sector 201, rather than the small vector POO of sector 201. By including the N-type small vector ONO, the sequence 800 may be associated with and used to charge the opposite DC bus capacitor as the sequence 700. Having both the sequence 700 and the sequence 800 associated with a single sector may, therefore, allow active control of the voltage balance across the DC bus capacitors. Specifically, a controller may monitor the voltages across the DC bus capacitors and switch between the sequence 700 and sequence 800 as necessary.

Figure 9:
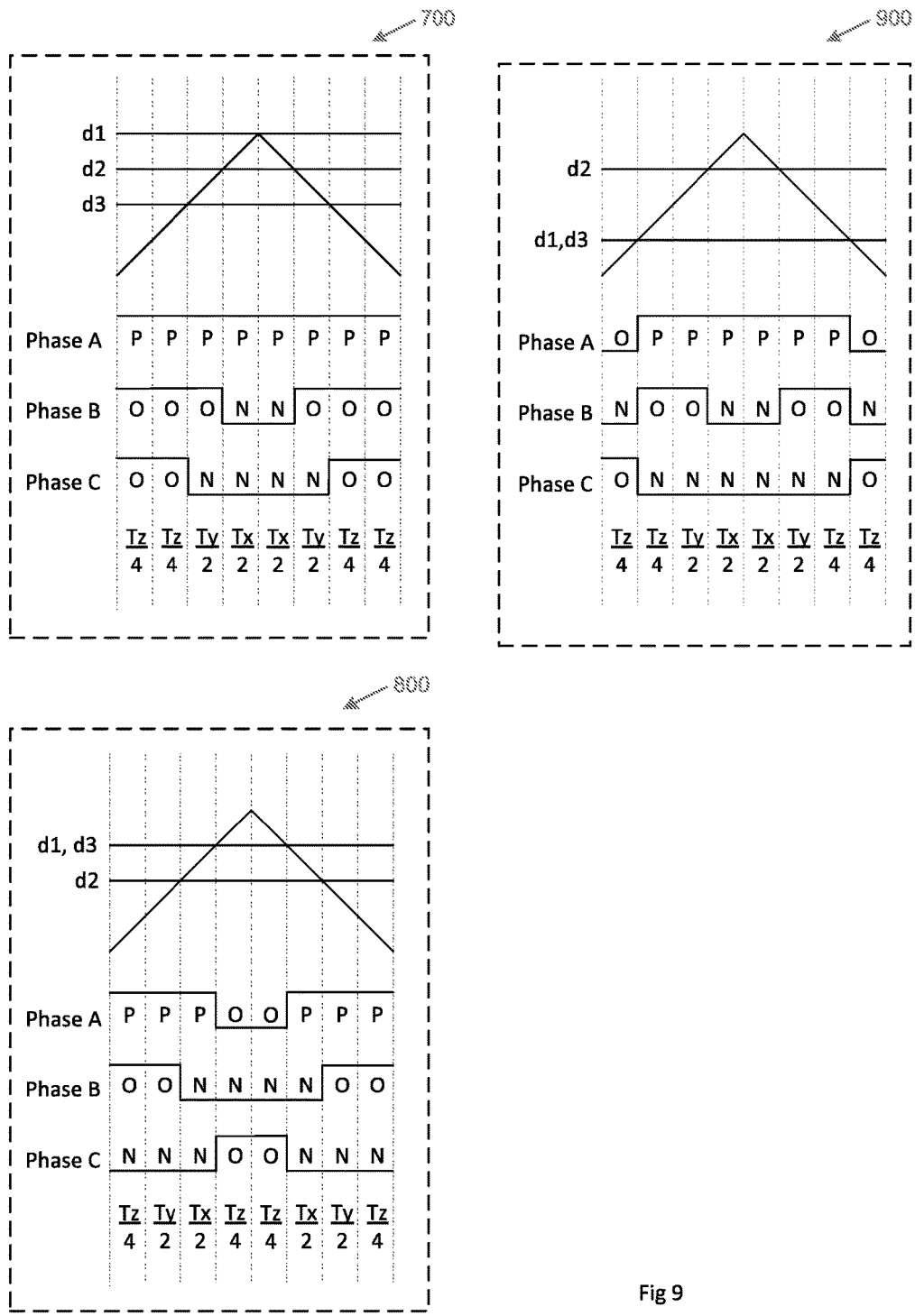

In certain embodiments, the second sequence of switching states for a given sector may be generated, at least in part, by substituting the switching state associated with the small vector outside of the sector for the switching state associated with the small vector that defines the sector. FIG. 9 illustrates an example process for generating the second sequence of switching states 800 from the first sequence of switching states 700, according to aspects of the present disclosure. Specifically, FIG. 9 illustrates the sequence 700, the sequence 800, and an intermediate sequence 900 in which the P-type small vector POO entries have been removed and N-type small vector entries ONO have been introduced instead.

The process for substituting the switching state (e.g., ONO) associated with the small vector outside of the corresponding sector for the switching state (e.g. POO) associated with the small vector that defines the sector may comprise selecting the substitute vector and calculating the corresponding dwell times for the switching states in the second sequence 800. In the example sequences shown, the ONO vector has been selected as the substitute small vector. It should be appreciated, however, that other small vectors may be appropriate with respect to the sequences shown, and that the selection may depend of the configuration of the space vector diagram and the sector to which the sequences correspond.

Substitution of an alternative switching state may impact dwell times for each switching state applied within the switching period. The dwell time for each switching state may be determined using conventional space vector modulation calculations and vector manipulation. Generally, dwell times may be calculated using the following formula:

$$V_{ref} * t_{SP} = \vec{A} * t_A + \vec{B} * t_B + \vec{C} * t_C$$

where $V_{ref}$ is the reference vector, $t_{SP}$ is the switching period, and switching signal vectors $\vec{A}$, $\vec{B}$, and $\vec{C}$ are applied for dwell times $t_A$, $t_B$, and $t_C$, respectively. After substituting a new vector $\vec{D}$ for the undesired vector $\vec{A}$ to create the second sequence, the formula for calculating the new dwell time becomes:

$$V_{ref} * t_{SP} = \vec{D} * t_D' + \vec{B} * t_B' + \vec{C} * t_C'$$

where $\vec{D}$ is the vector substituted for $\vec{A}$ and $t_D'$ is the dwell time for which $\vec{D}$ should be applied. Generally, vector $\vec{D}$ may be defined by a combination of adjacent and non-adjacent vectors and the dwell time $t_D'$ may then be calculated using standard vector algebra. In this case, $\vec{D}$ may be defined by a combination of vectors $\vec{B}$ and $\vec{C}$. Therefore, dwell time $t_D'$ may be calculated using the equation above.

When applied to the examples shown in sequences 700, 800, 900 of FIGS. 7-9, the algorithm above yields the following:

$$V_{ref} * t_{SP} = \vec{A} * t_A + \vec{B} * t_B + \vec{C} * t_C = \overrightarrow{POO} * t_A + \overrightarrow{PON} * t_B + \overrightarrow{PNN} * t_C$$

$$V_{ref} * t_{SP} = \vec{D} * t_D' + \vec{B} * t_B' + \vec{C} * t_C' = \overrightarrow{ONO} * t_D' + \overrightarrow{PON} * t_B' + \overrightarrow{PNN} * t_C'$$

Therefore, $\vec{D}$ may be calculated using standard vector algebra and then solve for $t_D'$.

$$\overrightarrow{POO} \to \frac{1}{2}(\overrightarrow{PNN}) = \frac{1}{2}(\overrightarrow{PON} + \overrightarrow{ONO})$$

$$\overrightarrow{POO} * t_A = \overrightarrow{PON} * \frac{1}{2} t_A + \overrightarrow{ONO} * \frac{1}{2} t_A$$

$$t_B' = t_B + \frac{1}{2} t_A$$

$$t_C' = t_C$$

$$t_D' = \frac{1}{2} t_A$$

The dwell time for the vectors comprising D are: ONO applied for one half of the POO dwell time in sequence 700, and PON applied for one half of the POO dwell time in sequence 700.

Accordingly, in this example, POO is no longer applied and has been replaced by application of the ONO and PON switching states, with both states applied for half the original POO dwell time. PNN and PON are both applied for their original dwell times. Those with ordinary skill in the art will note that, when the dwell times are combined, PON is now applied for half the original POO dwell time in addition to the original PON dwell time.

$$t'_{PON\_800} = t_{PON\_700} + \frac{1}{2} t_{POO\_700}$$

The new sequence and dwell times are illustrated in sequences 700, 800, and 900 of FIGS. 7-9. In sequence 700, POO is applied four times, PON is applied twice, and PNN is applied twice. The intermediate sequence 900 shows the same vectors used by the sequence 800 in a different order, with ONO applied twice, PON applied four times, and PNN applied twice. According to the equation above, PON is applied four times because it is applied for the original PON dwell time, twice in the switching period, and also applied for half of the original POO dwell time, or half of four times in the period, yielding a total dwell time for PON of four times within the switching period. The dwell time for PNN remains unchanged between the sequences 700, 800, and 900. Similar calculations may be made for other combinations and orientations of switching states, as would be appreciated by one of ordinary skill in the art in view of this disclosure. It may be noted the sequence 900 may not be implemented by the duty cycles d1, d2, and d3 and therefore requires resequencing, as discussed above. The final resequenced result is illustrated by sequence 800. Accordingly, the sequences 700 and 800 may be applied by the controller as appropriate to balance the common mode voltage.

Figure 10:
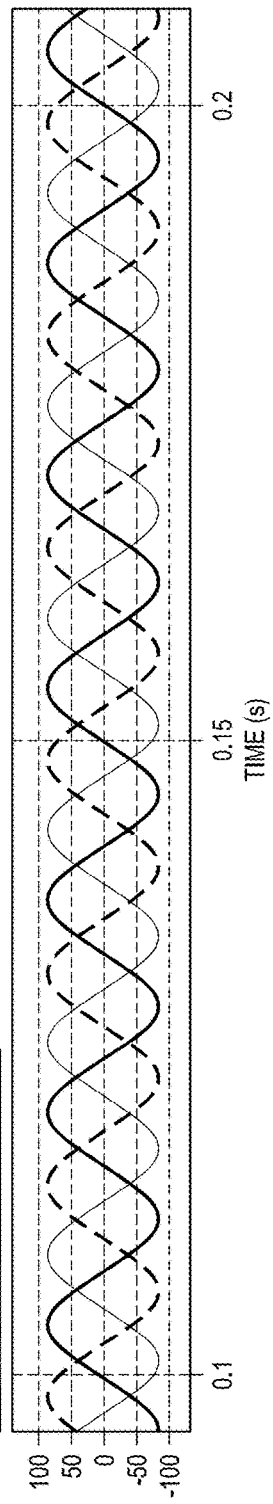
FIGS. 10A-C illustrate simulated results of grid current, common mode voltage, and leakage current of a three-phase three-level inverter system, wherein the controller applies known sequences of switching states according to aspects of the present disclosure.
Figure 10:
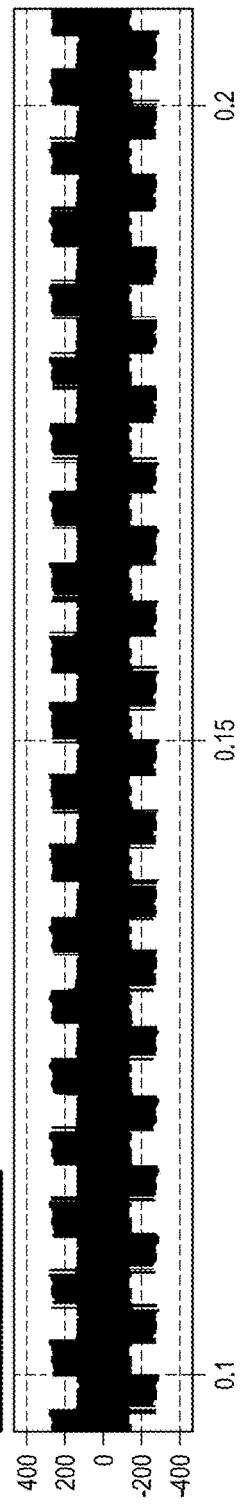
Figure 10:
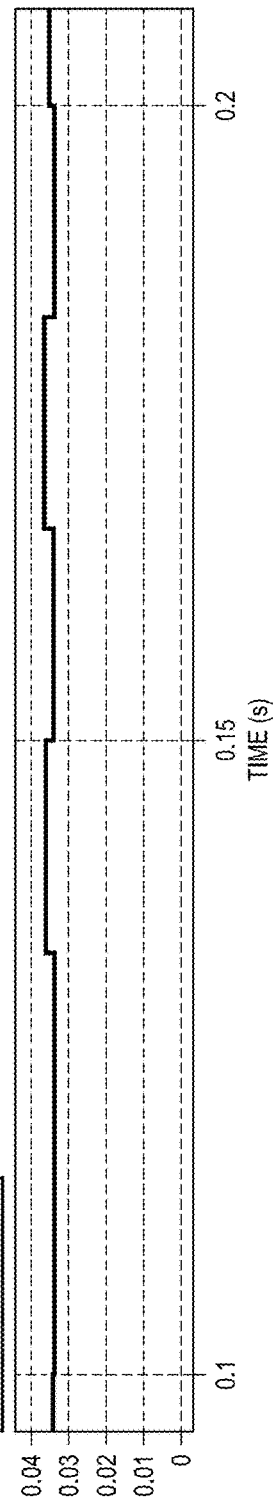
Figure 11:
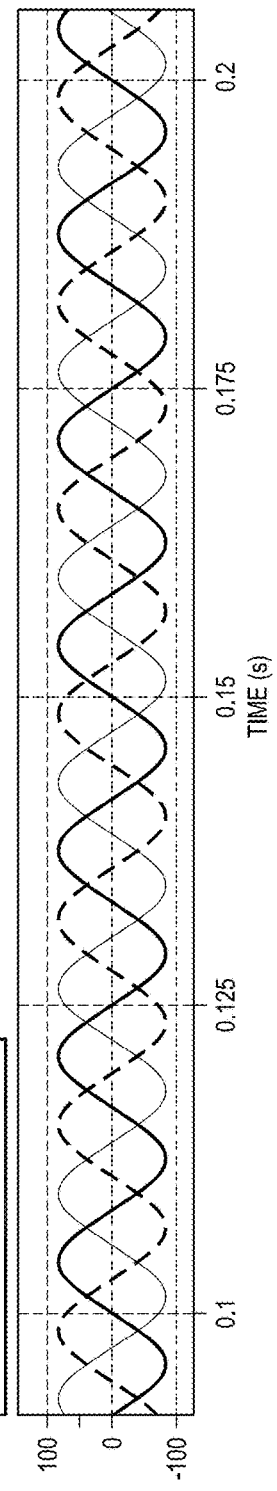
FIGS. 11A-C illustrate simulated results of grid current, common mode voltage, and leakage current of a three-phase three-level inverter system, wherein the controller applies sequences comprising reduced common mode voltage switching states, according to aspects of the present disclosure.
Figure 11:
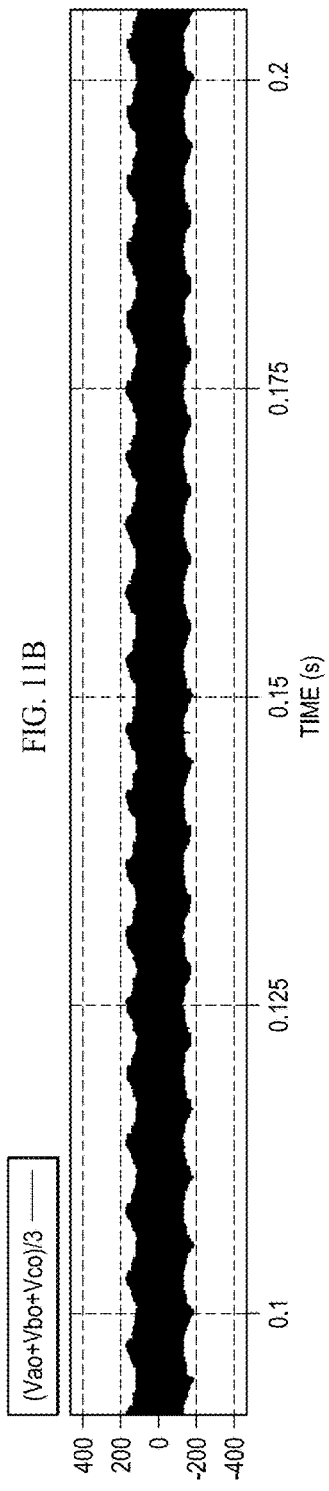
Figure 11:
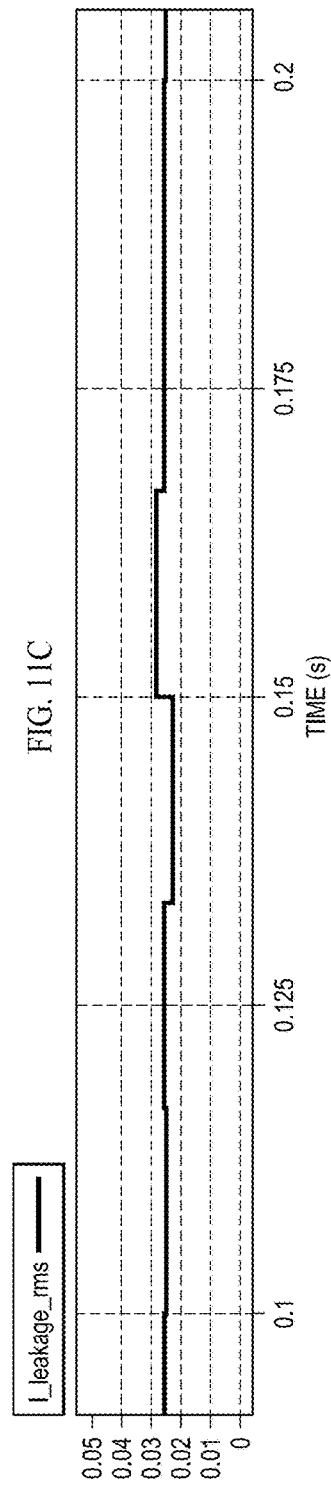

FIG. 10 indicates application of a known method for controlling the common mode voltage using a traditional space-vector modulation, while FIG. 11 represents simulation results after substituting lower common mode voltage states for higher common mode voltage states and resequencing the switching sequences to reduce the switching device frequency. FIGS. 10A and 11A depict grid currents Ia, Ib, and Ic of the three phases A, B, and C of the inverter, respectively, while FIGS. 10B and 11B illustrate the common mode voltage of the inverter 106. FIGS. 10C and 11C illustrate the common mode leakage current, I_leakage_rms.

FIG. 10 depicts the common mode voltage peaks at approximately 266 volts, or approximately $V_{DC}/3$ when $V_{DC}$ is 800 volts. In contrast, FIG. 11 indicates a peak common mode voltage of 133 volts, or approximately $V_{DC}/6$. By substituting lower common mode voltage states for the higher common mode voltage states, the present invention reduces the common mode voltage by approximately one half as compared with known implementations. Furthermore, the present invention may reduce the common mode leakage current as shown by comparing FIG. 10C with FIG. 11C. Peak leakage current is approximately 35 mA in FIG. 10C, while after applying the present invention reduces the leakage current to approximately 25 mA, or approximately 70% of the original current shown in FIG. 11C.

Figure 12:
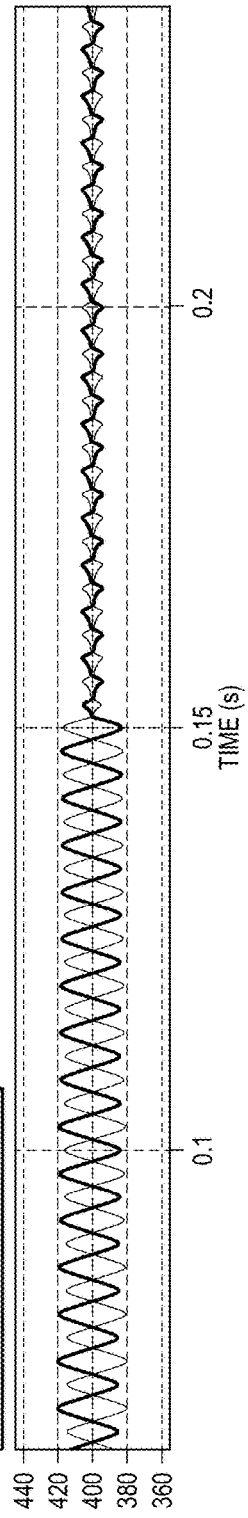
FIGS. 12A-C illustrate simulated results of grid current, common mode voltage, and voltages across two capacitors of a three-phase three-level inverter system, wherein the controller applies active voltage balancing across the two capacitors according to aspects of the present disclosure.
Figure 12:
Figure 12:
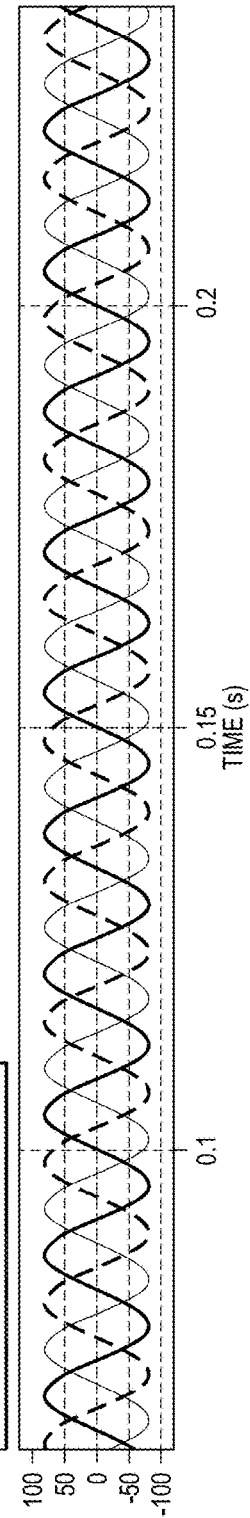

FIG. 12 illustrates application of active voltage balancing to the circuit depicted in FIGS. 1A and 1B. FIG. 12A illustrates the voltages across the capacitors C1 and C2, represented by Vdc_p and Vdc_n respectively. The common mode voltage is represented by $(V_{oo}+V_{bo}+V_{co})/3$ in FIG. 12B. FIG. 12C illustrates the simulated current associated with phases A, B, and C of the inverter, represented by Ia, Ib, and Ic respectively. The first 150 milliseconds (0.15 s) illustrate the system operations without active voltage control, during which the common mode voltage amplitude is approximately 133 volts, with voltage ripples of approximately 40 volts peak-to-peak for Vdc_p and Vdc_n. The present invention, applied following the first 150 milliseconds, shows a reduction in the common mode voltage as compared with the implementation of the traditional space-vector modulation method. FIG. 12A illustrates the algorithm reduces voltage ripples across capacitors C1 and C2, represented by Vdc_p and Vdc_n, and illustrates the common mode voltage amplitude, shown in FIG. 12B, generally remains unchanged. Accordingly, the present invention may balance voltage across capacitors C1 and C2 while simultaneously maintaining a lower common mode voltage.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A system, comprising:
    a direct current (DC) connection comprising a DC power source, a first and a second terminal coupled to the DC power source, a first at least one and a second at least one capacitor connected in series between the first and the second terminals, and connected to each other at a common node;
    an inverter coupled to the DC connection, the inverter including three phases of at least one switching device, each phase of at least one switching device coupled to a different output terminal of the inverter, wherein each phase of at least one switching device is individually operable in one of a first mode, a second mode, and a third mode, and wherein the inverter is characterized by a plurality of switching states corresponding to all possible combinations of the first mode, the second mode, and the third mode in which the three phases of switching devices can operate simultaneously; and
    a controller coupled to the switching devices, wherein the controller is operable to generate a plurality of switching signals corresponding to a subset of switching states from the plurality of switching states based, at least in part, on the common mode voltages associated with the plurality of switching states, and wherein the controller selects sequences of switching states based on at least one of the voltage across at least one of the first at least one capacitor and the voltage across the second at least one capacitor.

2. The system of claim 1, wherein at least one switching state of the inverter is represented by a vector in a space vector diagram that includes a plurality of vectors.

3. The system of claim 1, wherein
    the first mode comprises a "P" mode and when one of the three phases of switching devices is operating in the P mode, the corresponding switching devices couple the corresponding output terminal of the inverter to the first terminal of the DC connection;
    the second mode comprises an "O" mode and when one of the three phases of switching devices is operating in the O mode, the corresponding switching devices couple the corresponding output terminal of the inverter to the common node of the DC connection;
    the third mode comprises an "N" mode and when one of the three phases of switching devices is operating in the N mode, the corresponding switching devices couple the corresponding output terminal of the inverter to the second terminal of the DC connection.

4. The system of claim 2, wherein the subset of switching states comprise a first sequence of switching states capable of charging one of the first at least one and the second at least one capacitors, and a second sequence of switching states capable of charging the other of the first at least one and the second at least one capacitors.

5. The system of claim 4, wherein the controller selects the first sequence and the second sequence of switching states to balance the voltage across the first at least one and the second at least one capacitors.

6. The system of claim 4, wherein the space vector diagram comprises zero vectors, small vectors, medium vectors, and large vectors, and the subset of switching states is based, at least in part, on the location of a reference vector in the space vector diagram.

7. The system of claim 6, wherein the first sequence of switching states comprises at least one switching state corresponding to a small vector adjacent to the reference vector.

8. The system of claim 7, wherein the second sequence of switching states comprises at least one switching state corresponding to a small vector not adjacent to the reference vector; and wherein the second sequence is created, at least in part, by replacing the at least one switching state corresponding to a small vector adjacent to the reference vector in the first sequence with the at least one switching state corresponding to a small vector not adjacent to the reference vector.

9. The system of claim 6, wherein the controller selects the first sequence of switching states and the second sequence of switching states based, at least in part, on at least one of a measured voltage across at least one of the first at least one capacitor, the second at least one capacitor, and the reference vector in the space vector diagram.

10. The system of claim 2, wherein the first and the second sequences of switching states comprise switching states corresponding to the zero vectors, small vectors, medium vectors, and large vectors of the space vector diagram.

11. A method, comprising:
    coupling a three-phase inverter to first and second terminals of a DC connection;
    connecting a first at least one and a second at least one capacitor in series between the first and the second terminals;
    coupling each phase of the inverter to at least one switching device;

coupling each at least one switching device to a different output terminal of the inverter;

creating a plurality of switching signals to individually operate each phase of at least one switching device in one of a first mode, a second mode, and a third mode;

identifying a plurality of switching states that correspond to all possible combinations of the first mode, the second mode, and the third mode in which the three phases of switching devices can simultaneously operate, wherein the plurality of switching states correspond to the plurality of switching signals;

selecting a subset of switching states from the plurality of switching states based, at least in part, on the common mode voltage;

creating a first sequence and a second sequence of switching states from the subset of switching states; and balancing a voltage across at least one of the first at least one capacitor and the second at least one capacitor using the first and the second sequences of switching states.

12. The method of claim 11, wherein the first and the second sequences of switching states correspond to sequences of vectors of a space vector diagram, the space vector diagram comprising zero vectors, small vectors, medium vectors, large vectors, and a reference vector, wherein each vector represents at least one switching state of the inverter, and wherein the subset of switching states is selected using a common mode voltage threshold value of one sixth of a voltage measured at the DC connection.

13. The method of claim 11, wherein the first sequence is capable of charging one of the first at least one and the second at least one capacitors, wherein the second sequence is capable of charging the other of the first at least one and the second at least one capacitors, wherein one of the first sequence or the second sequence comprises at least one switching state corresponding to a small vector adjacent to the reference vector, and wherein the other of the first sequence or the second sequence comprises at least one switching state corresponding to a small vector not adjacent to the reference vector.

14. The method of claim 13, wherein the second sequence of switching states is generated at least in part by substituting the at least one switching state corresponding to the small vector not adjacent to the reference vector for the at least one switching state corresponding to the small vector adjacent to the corresponding sector.

15. The method of claim 13, wherein balancing a voltage across at least one of the first at least one capacitor and the second at least one capacitor comprises selecting the first and the second sequences is based, at least in part, on a measured voltage of at least one of the first at least one capacitor and the second at least one capacitor.

16. A method, comprising:

determining a first sequence of switching states associated with a sector in a space vector diagram, wherein the first sequence of switching states only includes switching states corresponding to vectors adjacent to the sector;

determining a second sequence of switching states associated with the sector, wherein the second sequence of switching states includes at least one switching state corresponding to a vector not adjacent to the sector; and controlling an inverter using at least one of the first sequence and the second sequence of switching states.

17. The method of claim 16, wherein determining the first sequence of switching states associated with a sector in a space vector diagram comprises excluding a vector from the space vector diagram because it corresponds to a switching state of the inverter associated with a high common mode voltage.

18. The method of claim 16, wherein the first sequence of switching states charges one of a first at least one capacitor and a second at least one capacitor connected in series between terminals of a direct current (DC) power source to which the inverter is coupled; and the second sequence of switching states charges the other one of the first at least one capacitor and the second at least one capacitor.

19. The method of claim 18, wherein the space vector diagram comprises zero vectors, small vectors, medium vectors, and large vectors, the first sequence of switching states comprises a switching state corresponding to a small vector adjacent to the sector associated with charging one of the first at least one capacitor and the second at least one capacitor, and the second sequence of switching states comprises another switching state corresponding to a small vector not adjacent to the sector associated with charging the other of the first at least one capacitor and the second at least one capacitor.

20. The method of claim 19, wherein determining the second sequence of switching states comprises substituting the other switching state represented by the small vector not adjacent to the sector for the switching state represented by the small vector adjacent to the sector in the first sequence of switching states.

\* \* \* \* \*